US012491568B2

(12) United States Patent
Duxbury et al.

(10) Patent No.: US 12,491,568 B2
(45) Date of Patent: Dec. 9, 2025

(54) MACHINING JIG FOR CREATING COMPOUND ANGLES

(71) Applicant: WOODPECKERS, LLC, Strongsville, OH (US)

(72) Inventors: Nathan William Duxbury, Northfield, OH (US); Paul E. Turley, Amherst, OH (US)

(73) Assignee: Woodpeckers, LLC, Strongsville, OH (US)

( * ) Notice: Subject to any disclaimer, the term of this patent is extended or adjusted under 35 U.S.C. 154(b) by 513 days.

(21) Appl. No.: 17/696,107

(22) Filed: Mar. 16, 2022

(65) Prior Publication Data

US 2023/0294181 A1 Sep. 21, 2023

(51) Int. Cl.
*B23B 47/28* (2006.01)

(52) U.S. Cl.
CPC .................................. *B23B 47/287* (2013.01)

(58) Field of Classification Search
CPC ....... B23B 47/287; B23B 47/28; B23B 47/00; B23B 2247/00; B23B 2260/084
See application file for complete search history.

(56) References Cited

U.S. PATENT DOCUMENTS 1,799,474 A 4/1931 Mcchesney
3,073,187 A * 1/1963 Aquilino ................. B23B 47/28 408/115 R
4,842,453 A 6/1989 Raines et al.
4,981,400 A 1/1991 Stover
5,337,641 A 8/1994 Duginske
5,634,748 A 6/1997 Brazell et al.
5,765,273 A 6/1998 Mora et al.
5,782,006 A 7/1998 Erway et al.
5,860,197 A 1/1999 Fox
(Continued)

FOREIGN PATENT DOCUMENTS

DE 102015012779 4/2017
DE 102016004924 10/2017
(Continued)

OTHER PUBLICATIONS

English translation of KR 20180002814 (Year: 2018).*
(Continued)

*Primary Examiner* — Alan Snyder
(74) *Attorney, Agent, or Firm* — Sand, Sebolt & Wernow Co., LPA

(57) ABSTRACT

A machining jig used for adjusting and aligning a workpiece with a drill bit of a drill press in order to make at least one hole at at least one desired compound angle in a workpiece. The machining jig includes a base table adapted to be operably engaged with a drill press table. The machining jig also includes a work table operably engaged with the base table, wherein the work table is pivotably moveable relative to the base table. The machining jig also includes an adjustment assembly operably engaged with the work table and the base table. The adjustment assembly is configured to pivotably adjust the work table to an angle relative to the base table, wherein the angle is selected from a range of predetermined angles. The adjustment assembly also secures the work table to the base table at the selected angle.

27 Claims, 29 Drawing Sheets

(56) References Cited

U.S. PATENT DOCUMENTS

| | | | |
|---|---|---|---|
| 6,775,917 B1 | 8/2004 | Campbell | |
| 6,857,829 B2 | 2/2005 | Newton et al. | |
| 7,147,412 B2 | 12/2006 | Davis | |
| 7,762,749 B2 | 7/2010 | Kiezel | |
| 9,364,902 B1 * | 6/2016 | Ruggiero | B23B 39/06 |
| 9,370,828 B2 | 6/2016 | Adkins et al. | |
| 2001/0036389 A1 | 11/2001 | Park | |
| 2002/0094248 A1 | 7/2002 | Smith | |
| 2007/0166115 A1 | 7/2007 | Pemberton et al. | |
| 2015/0283620 A1 | 10/2015 | Chang | |
| 2019/0358715 A1 * | 11/2019 | Yu | B25H 1/0042 |

FOREIGN PATENT DOCUMENTS

| | | | | |
|---|---|---|---|---|
| GB | 2132516 A | * | 7/1984 | B23Q 3/102 |
| KR | 20180002814 U | * | 10/2018 | B23B 47/00 |

OTHER PUBLICATIONS

Woodworker's Journal downloadable plans: Tilting Table for the Drill Press; 2007; 5 Pages.
Penn Tool Co.; www.penntoolco.com; Copyright 2022 Penn Tool Co., Inc.; 5 Pages.
Lee Valley Home; Self-Centering Pen Drilling Vise; 1 page.
Raptor Woodworking Products; https://raptorworkholding.com; 2021 Copyright Raptor Workholding; 2 Pages.
Rockler; Rockler Self-Centering Drill Vise; 5 Pages.
Penn Tool Co.; www.penntoolco.com; Copyright 2022 Penn Tool Co., Inc.; Vertex; 3 Pages.
Machine Translation DE_102015012779_A1 (Year: 2017).
Machine Translation DE_102016004924 (Year: 2017).

* cited by examiner

MACHINING JIG FOR CREATING COMPOUND ANGLES

TECHNICAL FIELD

The present disclosure generally relates to a multipurpose tool. More particularly, the present disclosure relates to a portable angle drilling table. Specifically, the present disclosure relates to a portable angle drilling table that is useable to enable a user to more accurately use a drill press to drill a hole into a workpiece at compound angles without adjusting a table of the drill press.

BACKGROUND

Drill presses are versatile tools which are used in multiple projects for drilling holes into different types of workpiece, such as wood workpiece. Generally, drill presses are used in woodworking projects for drilling and/or boring substantially vertical holes of different dimensions based on the selected drilling bit used with a selected drill press. While a woodworker may use a drill press to drill various types of holes in workpiece, it is difficult and demanding to drill precise and accurate holes into a workpiece where the holes are to be drilled at more than one angle (i.e., compound angles).

Generally, the woodworker may simply adjust the table of the drill press to combat these angles. While such adjusting is viable, the woodworker may have to periodically adjust the table of the drill press at various angles to complete a single woodworking project. Such continuous adjustment during a single woodworking project requires the expenditure of more time and effort when the woodworker is drilling multiple holes into a workpiece or into numerous types of workpiece. Such continuous adjustment during a single woodworking project may also create inaccurate drilling of holes into a workpiece due to the constant expenditure of manipulating and leveling the table of the drill press during woodworking projects.

To combat these issues, a woodworker may select a device or multiple devices to help drill at at least one suitable angle during a drilling operation. While such assisting devices are provided in the market, the woodworker may have to use a number of different devices to drill different precise holes into a workpiece at more than one angle. For example, the woodworker may have to use a first set of assisting devices with a drill press for drilling a first hole with a first set of dimensions (e.g., a first compound angle) and a second set of assisting devices with the drill press for drilling a second hole with a second set of dimensions (e.g., a second different compound angle). Such use of multiple assisting devices requires the woodworker to have access to these various assisting devices and requires the expenditure of more time and effort when the woodworker is drilling multiple holes into a workpiece.

SUMMARY

The presently disclosed machining jig provides a woodworker with a multifunctional tool which may be used for adjusting and aligning a workpiece with a drill bit of a drill press in order to make at least one hole at at least one desired compound angle in a workpiece. The disclosed machining jig eliminates the step of a woodworker readjusting and/or reorienting a table of a drill press to complete a project and reduces the project's completion time since the need to readjust the table of the drill press is avoided. As such, the machining jig disclosed herein addresses some of the inadequacies of previously known drill assisting devices or machining jigs.

In one aspect, an exemplary embodiment of the present disclosure may provide a machining jig. The machining jig includes a base table adapted to be operably engaged with a drill press table. The machining jig also includes a work table operably engaged with the base table, wherein the work table is pivotably moveable relative to the base table. The machining jig also includes an adjustment assembly operably engaged with the work table and the base table. The adjustment assembly is configured to pivotably adjust the work table to an angle relative to the base table, wherein the angle is selected from a range of predetermined angles. The adjustment assembly also secures the work table to the base table at the selected angle.

This exemplary embodiment or another exemplary embodiment may further provide a riser operably engaged with the base table; wherein the riser is operably engaged with the drill press table and is interposed between the base table and the drill press table; and wherein the riser elevates the base table a distance away from the drill press table. This exemplary embodiment or another exemplary embodiment may further provide that the adjustment assembly includes a meshing mechanism which secures the work table to the base table at the selected angled. This exemplary embodiment or another exemplary embodiment may further provide that the adjustment assembly comprises a protractor plate operably engaged with one of the work table and the base table; and a selector operably engaged with the other of the work table and the base table; wherein the selector is configured to operably engage with the protractor plate to secure the work table at the selected angle relative to the base table. This exemplary embodiment or another exemplary embodiment may further provide an indicator operably configured to indicate the selected angle on the protractor plate at which the work table is positioned relative to the base table. This exemplary embodiment or another exemplary embodiment may further provide that the adjustment assembly further comprises a set of indexing teeth defined in the protractor plate, wherein the set of indexing teeth defines the range of predetermined angles; and a set of selecting teeth defined in the selector, wherein the set of selecting teeth is configured to operably mesh with the set of indexing teeth to secure the work table at the selected angle relative to the base table. This exemplary embodiment or another exemplary embodiment may further provide a locking plate assembly operably engaged with the base table and the work table and is located opposite the adjustment assembly on the base table and the work table; and wherein the locking plate assembly maintains the work table at the selected angle relative to the base table. This exemplary embodiment or another exemplary embodiment may further provide that the riser comprises a platform configured to operably engage with the base table; at least one foot operably engaged with the platform; and wherein the at least one foot is adapted to be operably engaged with the drill press table. This exemplary embodiment or another exemplary embodiment may further provide that the riser further comprises at least one attachment aperture defined in the at least one foot; and at least one fastener receivable through the at least one attachment aperture to operably engage the at least one foot with the drill press table. This exemplary embodiment or another exemplary embodiment may further provide that the riser further comprises at least one key hole defined in the at least one foot, wherein the at least one key hole is adapted to receive a fastener to engage the machining jig on a remote support surface. This exemplary embodiment or another exemplary embodiment may further provide a fence assembly operably engaged with the work table, wherein the fence assembly is selectively adjustable relative to the work table and is positionable at a second angle that is different to the selected angle at which the work table is secured to the base table. This exemplary embodiment or another exemplary embodiment may further provide that the fence assembly comprises a fence having a plate and a first rail and a second rail extending away from the plate and collectively defining a T-shaped channel; wherein the fence is adapted to operably engage with a first outermost edge of a workpiece; and at least one adjustment lever operably engaging the fence with the work table via at least one outer channel defined in the work table. This exemplary embodiment or another exemplary embodiment may further provide that the fence assembly further comprises a flip stop operably engaged with the first rail and the second rail of the fence; wherein the flip stop is adapted to operably engage with a second outermost edge of the workpiece that is orthogonal to the first outermost edge of the workpiece. This exemplary embodiment or another exemplary embodiment may further provide an angle scale provided on the work table, wherein the angle scale is configured to provide at least one set of measurement markings. This exemplary embodiment or another exemplary embodiment may further provide that the work table includes an outer surface, and a V-shaped groove is defined in the outer surface, and wherein the V-shaped groove is adapted to allow the work table to hold a curvilinear workpiece. This exemplary embodiment or another exemplary embodiment may further provide that the work table includes a central opening defined by the work table; wherein the machining jig includes a sacrificial insert operably engaged with the work table; and wherein the sacrificial insert is positioned inside of the central opening of the work table. This exemplary embodiment or another exemplary embodiment may further provide a clamping system operably engaged with the work table, wherein the clamping system is adapted to secure a workpiece to the work table. This exemplary embodiment or another exemplary embodiment may further provide that the clamping system comprises a fixed wedge operably engaged with the work table; and a moveable wedge operably engaged with the fixed wedge and the workpiece. This exemplary embodiment or another exemplary embodiment may further provide that the clamping system further comprises at least one pivot clamp pivotally engaged with the work table and adapted to selectively clamp the workpiece. This exemplary embodiment or another exemplary embodiment may further provide that the clamping system further comprises at least one button stop operably engaged with the work table, wherein the at least button stop is adapted to secure an outermost end of a round workpiece on the work table. This exemplary embodiment or another exemplary embodiment may further provide a centering device operably engageable with the work table and adapted to receive a workpiece therein.

In another aspect, an exemplary embodiment of the present disclosure may provide a method of drilling at least one angled hole in a workpiece. The method comprises steps of adjusting a work table of a machining jig, via an adjusting assembly, to a selected angle relative to a base table of the machining jig; securing the work table to the base table at the selected angle via the adjusting assembly; engaging the base table of the machining jig at a desired orientation on a drill press table; engaging a workpiece on the work table; and drilling the at least one angled hole in the workpiece.

This exemplary embodiment or another exemplary embodiment may further provide that the step of engaging the base table on the drill press table includes engaging the base table with a riser of the machining jig; and engaging the riser with the drill press table. This exemplary embodiment or another exemplary embodiment may further provide steps of selecting the selected angle via an indicator of the adjusting assembly; meshing a set of indexing teeth of a protractor plate of the adjusting assembly with a set of selecting teeth of a selector of the adjusting assembly at the selected angle; engaging a first securement mechanism to lock the protractor plate to one of the work table and the base table; and engaging a second securement mechanism to lock the selector to the other of the work table and base table. This exemplary embodiment or another exemplary embodiment may further provide a step of engaging a fence of a fence assembly with the work table. This exemplary embodiment or another exemplary embodiment may further provide steps of engaging a fixed wedge of a clamping system with the work table; placing a first outermost end of the workpiece against the fence of the fence assembly; jamming a moveable wedge of the clamping system between the fixed wedge and a second outermost end of the workpiece; and securing the workpiece between the moveable wedge and the fence. This exemplary embodiment or another exemplary embodiment may further provide steps of engaging at least one pivot clamp of a clamp assembly with the work table; and clamping the workpiece to the work table via the at least one pivot clamp. This exemplary embodiment or another exemplary embodiment may further provide steps of engaging a first button stop of a clamp assembly with the work table; engaging a second button stop of the clamp assembly with the work table a distance away from the first button stop; abutting a circumferential wall of the workpiece with the first button stop and the second button stop; and preventing movement of the workpiece on the work table with the first button stop and the second button step. This exemplary embodiment or another exemplary embodiment may further provide steps of engaging a centering device on the work table; introducing the workpiece into the centering device; centering the workpiece in the centering device; and clamping the workpiece to the work table via the centering device.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1A, 2-3, 5-18 illustrate a machining jig or angle drilling table that is generally referred to as 1. As described in more detail below, the machining jig 1 is configured to operably engage with a table of a drill press to enable a woodworker to drill or bore compound angled holes in a workpiece at desired compound angles from ranges of angles. The machining jig 1 also enables a woodworker to drill or bore angled holes in a workpiece while avoiding to readjust and/or reorient the table of the drill press upon completion of drilling said angled holes into said workpiece.

Figure 1A:
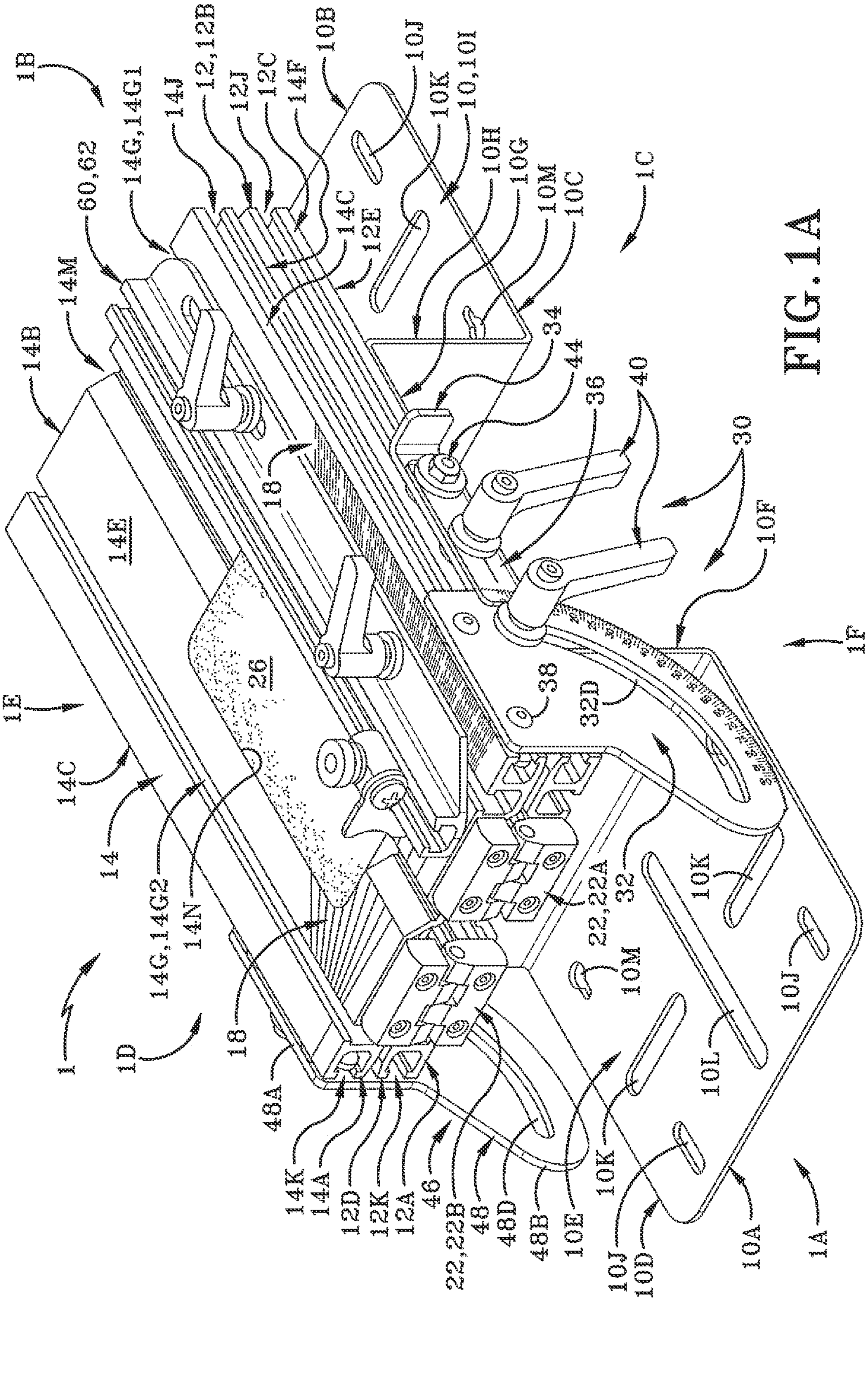
FIG. 1A (FIG. 1A) is a top, front, left side isometric perspective view of a machining jig in accordance with an aspect of the present disclosure, wherein the machining jig is illustrated operatively engaged with a fence assembly in accordance with a further aspect of the present disclosure.

As illustrated in FIG. 1A, the machining jig 1 includes a first or front end 1A, an opposing second or rear end 1B, and a longitudinal direction defined therebetween. The machining jig 1 also includes a first or left side 1C, an opposing second or right side 1D, and a transverse direction defined therebetween. The machining jig 1 also includes a third or top end 1E, an opposing fourth or bottom end 1F, and a vertical direction defined therebetween. It should be understood that the terms “front,” “rear,” “left,” “right,” “top,” “bottom”, and other directional derivatives used to describe the orientation of machining jig 1 illustrated in the attached figures should in no way be considered to limit the orientation in which machining jig 1 may be utilized during a drilling operation.

Figure 2:
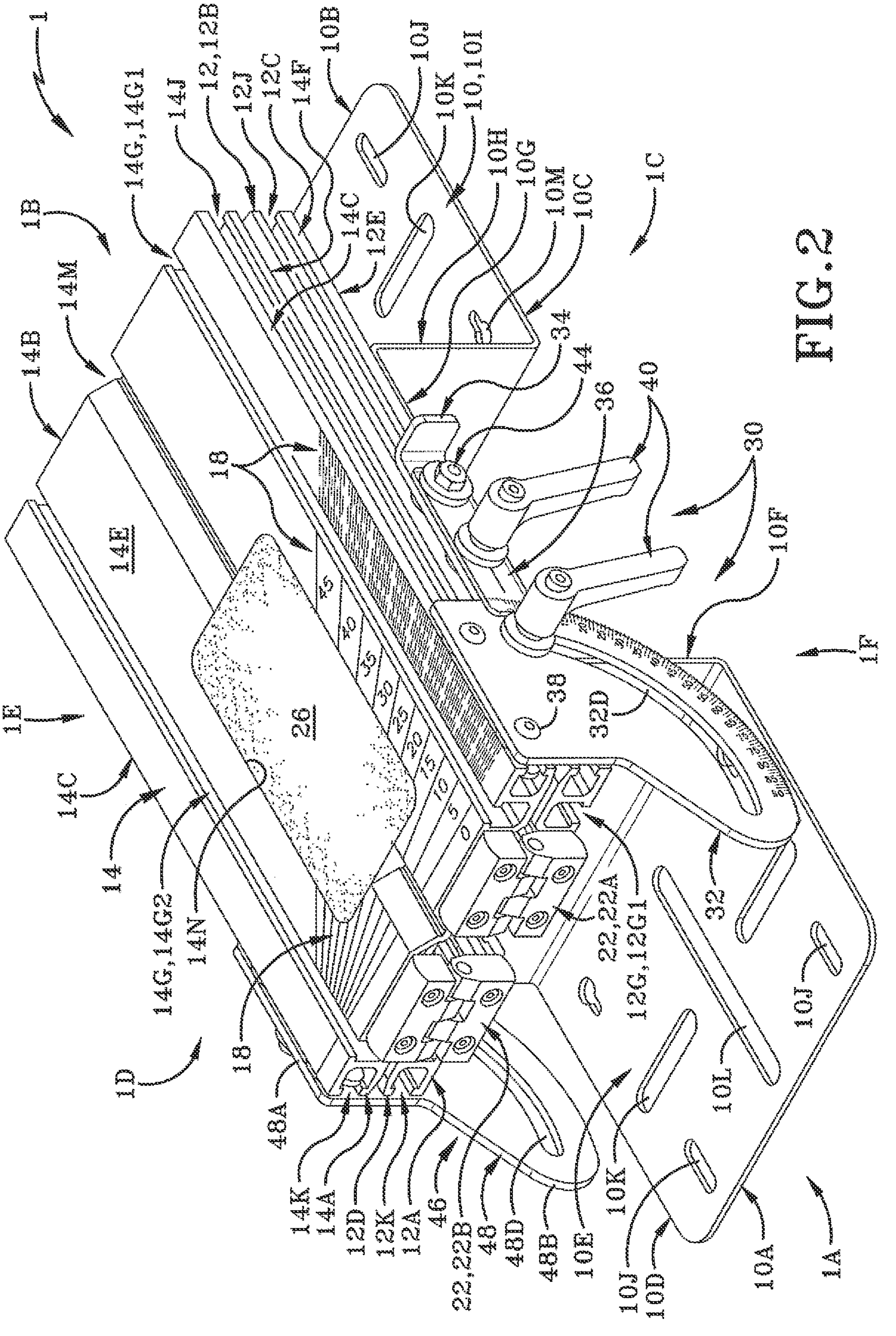
FIG. 2 (FIG. 2) is a top, front, left side isometric perspective view of the machining jig.

Referring to FIGS. 1A and 2, the machining jig 1 includes a riser 10. The riser 10 includes a first or front end 10A proximate to the front end 1A of the machining jig 1, an opposing second or rear end 10B proximate to the rear end 1B of the machining jig 1, and a longitudinal axis defined therebetween. The machining jig 1 also includes a first or left side 1C proximate to the left side 1C of the machining jig 1, an opposing second or right side 1D proximate to the right side 1D of the machining jig 1, and a transverse direction defined therebetween.

Still referring to FIGS. 1A and 2, the riser 10 includes at least one foot. Specifically, the riser 10 includes a first foot 10E that extends from the front end 10A of the riser 10 to a first upright support 10F of the riser 10. The first upright support 10F extends upwardly from the first foot 10E to a platform 10G of the riser 10. The platform 10G extends longitudinally from the first upright support 10F to a second upright support 10H of the riser 10. The second upright 10H also extends upwardly from a second foot 10I of the riser 10 to the platform 10G. The second foot 10I extends from the second upright support 10H to the rear end 10B. As illustrated in FIGS. 1A and 2, platform 10G is vertically above the first foot 10E and the second foot 10I via the first upright support 10F and the second upright support 10H. Such use of positioning the platform 10G vertically above the first foot 10E and the second foot 10I is described in more detail below.

Still referring to FIGS. 1A and 2, each of the first foot 10E and the second foot 10I defines at least one locking aperture 10J that extends entirely through each of the first foot 10E and the second foot 10I. Such use and purpose of the at least one locking aperture 10J is described in more detail below. In the illustrated embodiment, each of the first foot 10E and the second foot 10I defines first and second locking apertures 10J. The first and second locking apertures 10J of the first foot 10E are defined proximate to the front end 10A of the riser 10 and away from the platform 10G. The first and second locking apertures 10J of the second foot 10I are defined proximate to the rear end 10B of the riser 10 and away from the platform 10G (see FIGS. 2 and 11). During operation, the first and second locking apertures 10J of first and second feet 10E, 10I allow locking mechanisms (e.g., clamping screw knobs) to operably engage the riser 10 to a table of a drill press. In this example, the locking mechanism clamp and/or secure the riser 10 to the table of the drill press to maintain the position of the machining jig 1 when drilling compound angle holes into a workpiece.

Still referring to FIGS. 1A and 2, each of the first foot 10E and the second foot 10I defines transverse slots 10K. Each transverse slot 10K extends from one of the left side 10C and right side 10D of the respective foot 10E, 10I towards the medial part of the respective foot 10E, 10I. Each of the first foot 10E and the second foot 10I also defines a longitudinal slot 10L that bisects the transverse slots 10K. The longitudinal slot 10L defined in each foot 10E, 10I extends from one of the front end 10A and the rear end 10B towards the platform 10G. During operation, the transverse slots 10K and/or the longitudinal slot of each foot 10E, 10I allow locking mechanisms (e.g., clamping screw knobs) to operably engage the riser 10 to a table of a drill press. In this example, the locking mechanism clamp and/or secure the riser 10 to the table of the drill press to maintain the position of the machining jig 1 when drilling compound angle holes into a workpiece.

Still referring to FIGS. 1A and 2, each of the first foot 10E and the second foot 10I defines at least one keyhole 10M. The at least one keyhole 10M of each foot 10E, 10I is also defined proximate to the platform 10G near one of the first upright support 10F and the second upright support. The at least one keyhole 10M of each foot 10E, 10I extends entirely through each of foot 10E, 10I such that top and bottom surfaces of each foot 10E, 10I are in fluid communication with one another. In the illustrated embodiment, each foot 10E, 10I defines two keyholes 10M where the keyholes 10M of the first foot 10E are defined proximate to the platform 10G near the first upright support 10F, and the keyholes 10M of the second foot 10I are defined proximate to the platform 10G near the second upright support 10H. The keyholes 10M of the riser 10 allows a woodworker to mount the riser 10 via fasteners operably engaged with a support surface or support structure (e.g. a stud, a wall, etc.) for storage purposes.

Figure 8:
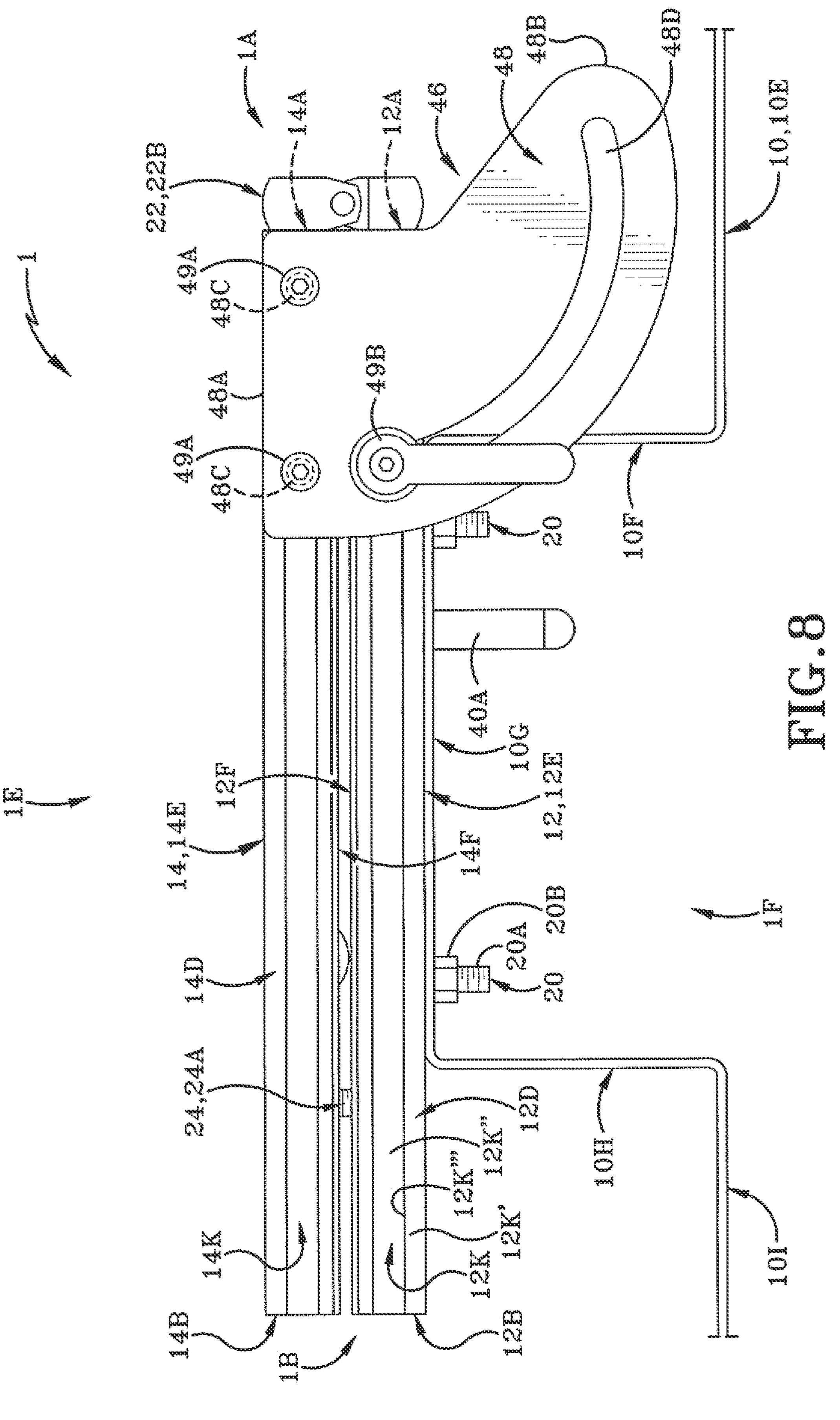
FIG. 8 (FIG. 8) is a partial right side elevation view of the machining jig.
Figure 9:
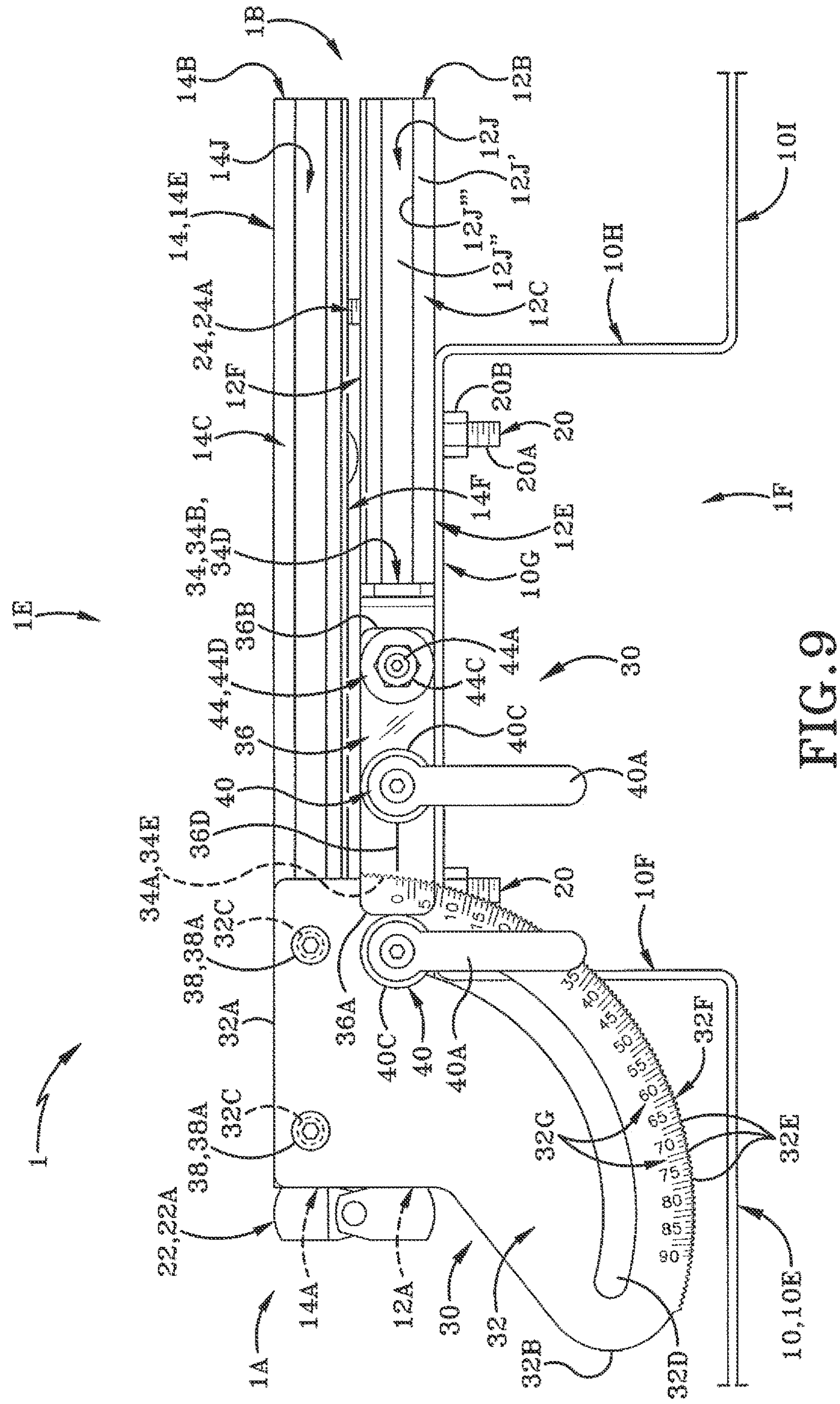
FIG. 9 (FIG. 9) is a partial left side elevation view of the machining jig, FIG. 10A (FIG. 10A) is an operational view of the machining jig, wherein a selector of the adjustment assembly disengages from a protractor plate of the adjustment assembly.

Referring to FIGS. 8 and 9, the platform 10G of the riser 10 also defines at least one attachment aperture 10N. The at least one attachment aperture 10N extends entirely through the platform 10G where top and bottom surfaces of the platform 10G are in fluid communication with one another. Such use and purpose of the at least one attachment aperture 10N is described in more detail below. In the illustrated embodiment, the platform 10G defines four attachment apertures 10N.

As illustrated herein, the base table 12 is operably engaged with the riser 10 (described in more detail below). As illustrated in FIG. 2, the base table 12 includes a first end 12A, a second end 12B opposite to the first end 12A, and a longitudinal axis defined therebetween. The base table 12 also includes a first side 12C, a second side 12D opposite to the first side 12C, and a transverse axis defined therebetween. The base table 12 also includes a bottom or outer surface 12E that extends from the first end 12A to the second end 12B. The outer surface 12E is a workpiece-engaging surface. The base table 12 also includes a top or inner surface 12F that extends from the first end 12A to the second end 12B and opposes the outer surface 12E relative to the longitudinal axis of the base table 12.

Figure 5:
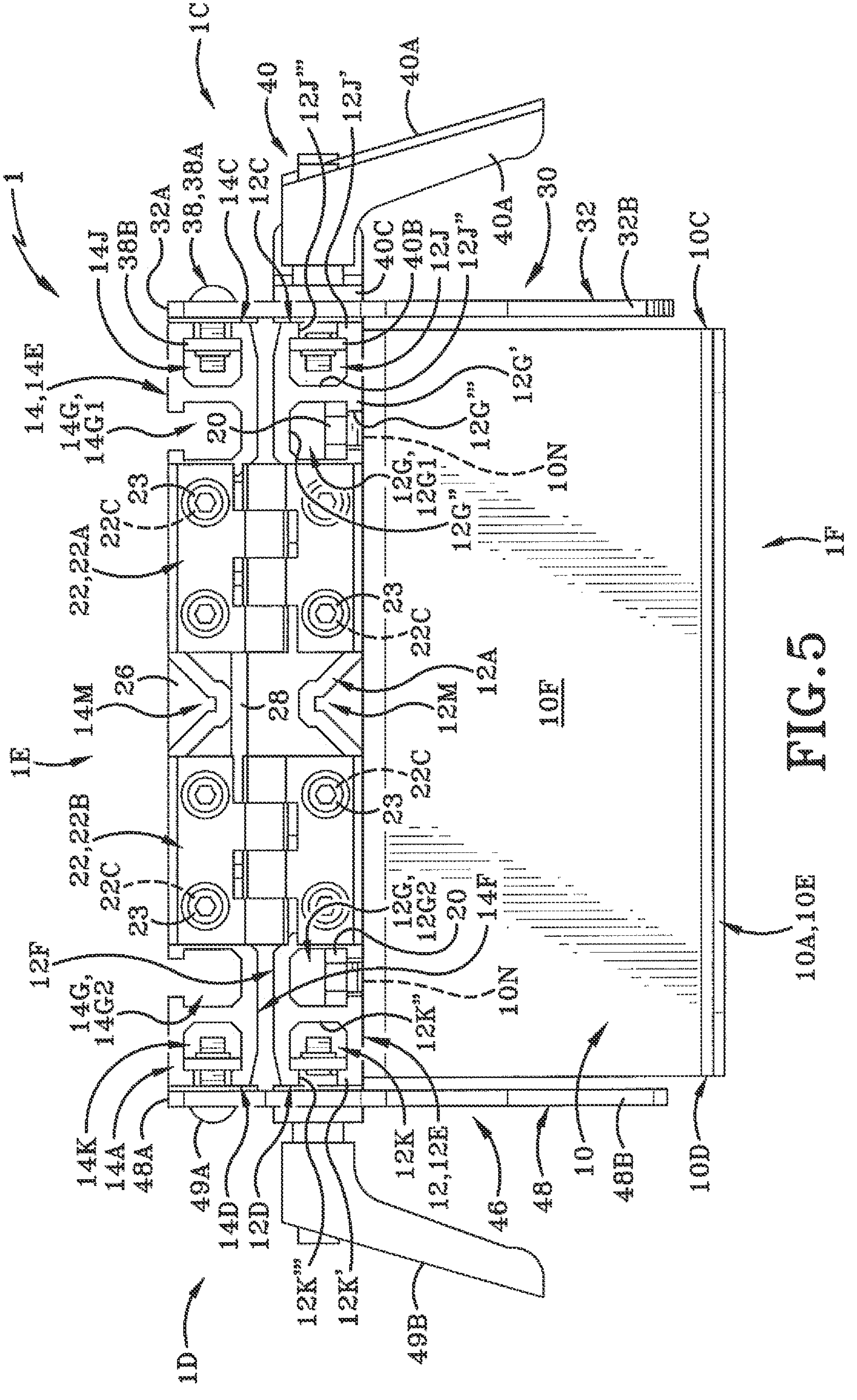
FIG. 5 (FIG. 5) is a front elevation view of the machining jig.
Figure 6:
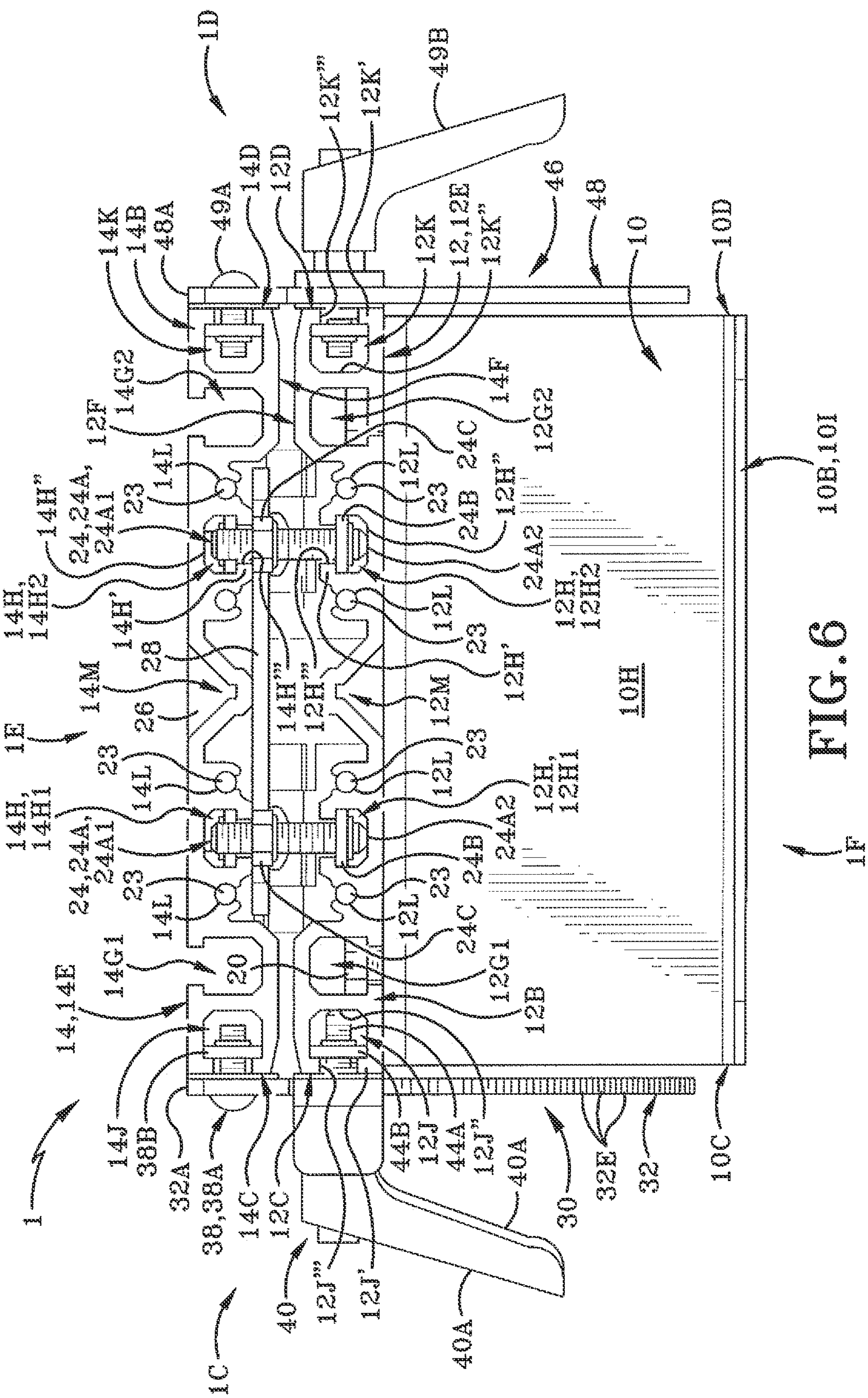
FIG. 6 (FIG. 6) is a rear elevation view of the machining jig.

Referring to FIGS. 2 and 5-6, the base table 12 defines at least one outer channel 12G. The at least one outer channel 12G extends longitudinally between the first end 12A and the second end 12B. The at least one outer channel 12G also extends vertically into the base table 12 from the outer surface 12E towards the inner surface 12F parallel with the vertical axis of the base table 12. Referring to FIG. 5, the at least one outer channel 12G is defined between an upper wall 12G' and a lower wall 12G" of the base table 12. Still referring to FIG. 5, the at least one outer channel 12G is accessible via a slot 12G"' defined by the upper wall 12G' and is accessible at the first and second ends 12A, 12B of the base table 12. The use and purpose of the at least one outer channel 12G is described in more detail below. In the illustrated embodiment, the base table 12 defines a first outer channel 12G1 proximate to the first side 12C of the base table 12 and defines a second outer channel 12G2 proximate to the second side 12D of the base table 12 opposite to the first outer channel 12G1 relative to the longitudinal axis of the base table 12.

Referring to FIG. 6, the base table 12 also defines at least one inner channel 12H adjacent to the at least one outer channel 12G. The at least one inner channel 12H extends longitudinally from the first end 12A to the second end 12B. The at least one inner channel 12H also extends vertically into the base table 12 from the inner surface 12F towards the outer surface 12E. The at least one inner channel 12H is defined between an upper wall 12H' and a lower wall 12H" of the base table 12. The at least one inner channel 12H is accessible via a slot 12H"' defined by the upper wall 12H' and is accessible at the first and second ends 12A, 12B of the base table 12. The use and purpose of the at least one inner channel 12H is described in more detail below. In the illustrated embodiment, the base table 12 defines a first inner channel 12H1 proximate to the first outer channel 12G1 and defines a second inner channel 12H2 proximate to the second outer channel 12G2 and opposite to the first inner channel 12H1 relative to the longitudinal axis of the base table 12.

Figure 3:
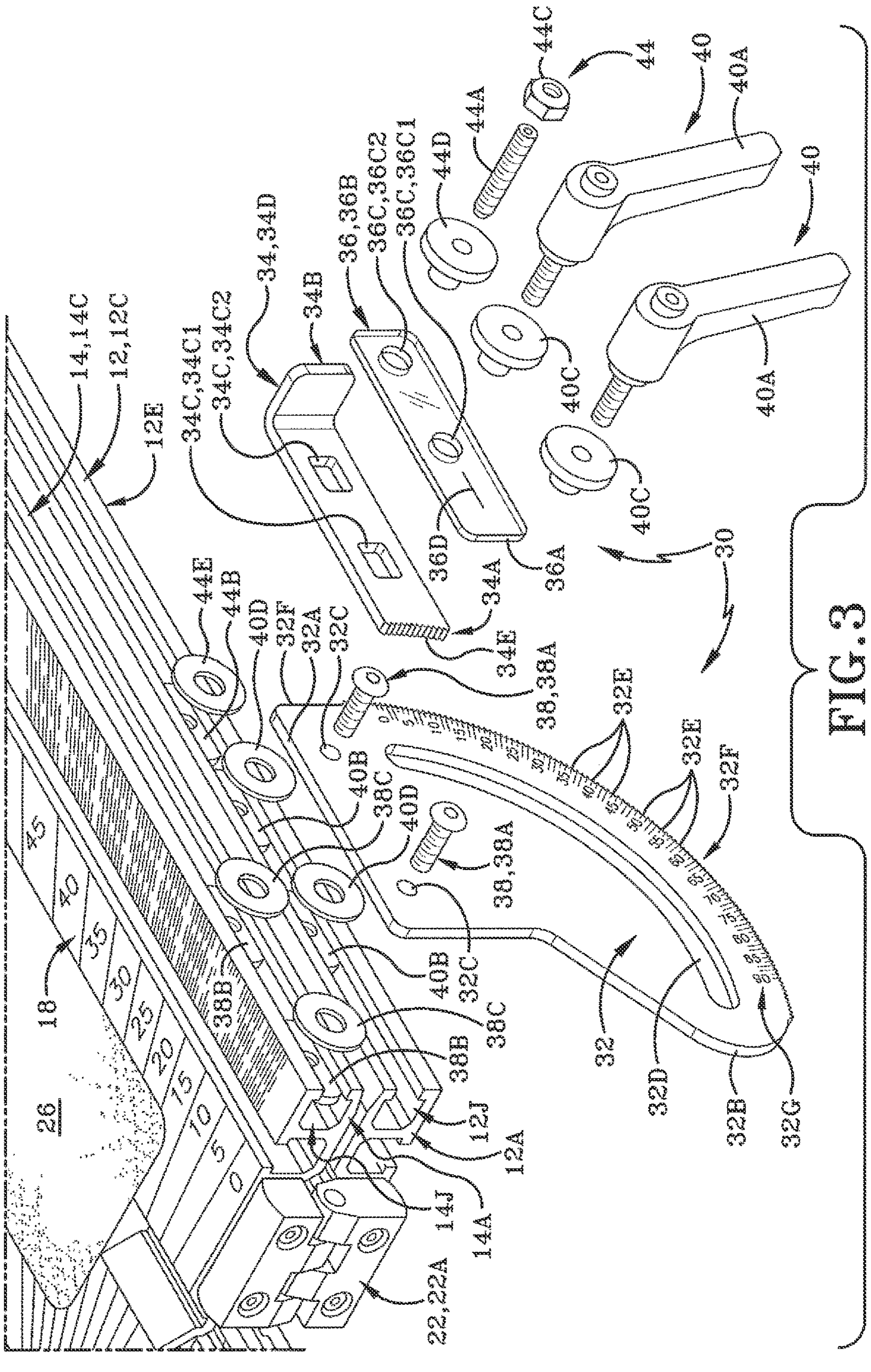
FIG. 3 (FIG. 3) is a partial top, front, left side isometric perspective view of the machining jig, wherein an adjustment assembly of the machining jig is exploded away from a base table and a work table of the machining jig.

Referring to FIGS. 3 and 5-6, the base table 12 also defines at least one first side channel 12J defined between the at least one outer channel 12G and the at least one inner channel 12H. The at least one first side channel 12J extends longitudinally from the first end 12A to the second end 12B. The at least one first side channel 12J also extends transversely into the base table 12 from the first side 12C towards the second side 12D. As illustrated in FIG. 6, the at least one first side channel 12J is defined between an exterior wall 12J' and an interior wall 12J" of the base table 12. The at least one first side channel 12J is accessible via a slot 12J'" defined by the exterior wall 12J' and is accessible at the first and second ends 12A, 12B of the base table 12. The use and purpose of the at least one first side channel 12J is described in more detail below. In the illustrated embodiment, the base table 12 defines a single first side channel 12J.

Referring to FIGS. 5-6, the base table 12 also defines at least one second side channel 12K defined between the at least one outer channel 12G and the at least one inner channel 12H. The at least one second side channel 12K extends longitudinally from the first end 12A to the second end 12B parallel with the at least one first side channel 12J. The at least one second side channel 12K also extends transversely into the base table 12 from the second side 12D towards the first side 12C. The at least one second side channel 12K is defined between an exterior wall 12K' and an interior wall 12K" of the base table 12. The at least one second side channel 12K is accessible via a slot 12K'" defined by the exterior wall 12J' and is accessible at the first and second ends 12A, 12B of the base table 12. The use and purpose of the at least one second side channel 12K is described in more detail below. In the illustrated embodiment, the base table 12 defines a single second side channel 12K.

Referring to FIG. 6, the base table 12 also defines at least one threaded passageway 12L. The at least one threaded passageway 12L extends longitudinally along the base table 12 from the first end 12A to the second end 12B parallel with the at least one outer channel 12G and the at least one inner channel 12H. Such use and purpose of the at least one threaded passageway 12L is described in more detail below. In the illustrated embodiment, the base table 12 defines four threaded passageways 12L.

Referring to FIGS. 5-6, the base table 12 also defines a V-shaped groove 12M. The V-shaped groove 12M extends vertically into the base table 12 from the inner surface 12F towards the outer surface 12E.

The machining jig 1 also includes a second table or work table 14 where the work table 14 is selectively pivotably moveable relative to the base table 12. The base table 12 and the work table 14 are substantially similar to one another and are engaged with one another in an inverted orientation where the base table 12 and the work table 14 face away from one another. (see FIGS. 5 and 6).

As illustrated herein, the work table 14 includes a first end 14A, a second end 14B opposite to the first end 14A, a first side 14C, a second side 14D opposite to the first side 14C, an outer or top surface 14E, and an inner or bottom surface 14F opposite to the outer surface 14E. The first end 14A, the second end 14B, the first side 14C, the second side 14D, the outer surface 14E, and the inner surface 14F are substantially similar to the first end 12A, the second end 12B, the first side 12C, the second side 12D, the outer surface 12E, and the inner surface 12F of the base table 12.

As illustrated herein, the work table 14 also includes at least one outer channel 14G, at least one inner channel 14H, at least one first side channel 14J, at least one second side channel 14K, and at least one threaded passageway 14L. The at least one outer channel 14G, the at least one inner channel 14H, the at least one first side channel 14J, the at least one second side channel 14K, and the at least one threaded passageway 14L are substantially similar to the at least one outer channel 12G, the at least one inner channel 12H, the at least one first side channel 12J, the at least one second side channel 12K, and the at least one threaded passageway 12L of the base table 12; except as detailed below. First, the at least one outer channel 14G of the work table 14 extends downwardly into the work table 14 from the outer surface 14E towards the inner surface 14F as compared to the at least one outer channel 12G of the base table 12. Second, the at least one inner channel 14H of the work table 14 extends upwardly into the work table 14 from the inner surface 14F towards the outer surface 14E as compared to the at least one inner channel 12H of the base table 12.

The work table 14 also define a V-shaped groove 14M that is identical to the V-shaped groove 12M defined by the base table 12. The V-shaped groove 14M of the work table 14 is adapted to allow a round workpiece (e.g., a dowel, a rod, or other rounded and/or curvilinear types of workpiece) to operably engaged with the work table 14 via the V-shaped groove 14M (see FIG. 14B). Such structural arrangement defined by the work table 14 prevents the rounded workpiece to move or shift along the outer surface 14E of the work table 14 when a drill press is drilling and/or boring a hole into the workpiece.

Referring to FIG. 14A, the work table 14 defines a central opening 14N. The central opening 14N is defined between the first end 14A and second end 14B of the work table 14 proximate to the first end 14A of the work table 14. The central opening 14N also extends entirely through the work table 14 where the outer surface 14E and the inner surface 14F of the work table 14 are in fluid communication with one another. Such use of the central opening is described in more detail below. While the work table 14 defines the central opening 14N, the base table 12 may also define a central hole in other exemplary embodiments.

Figure 7:
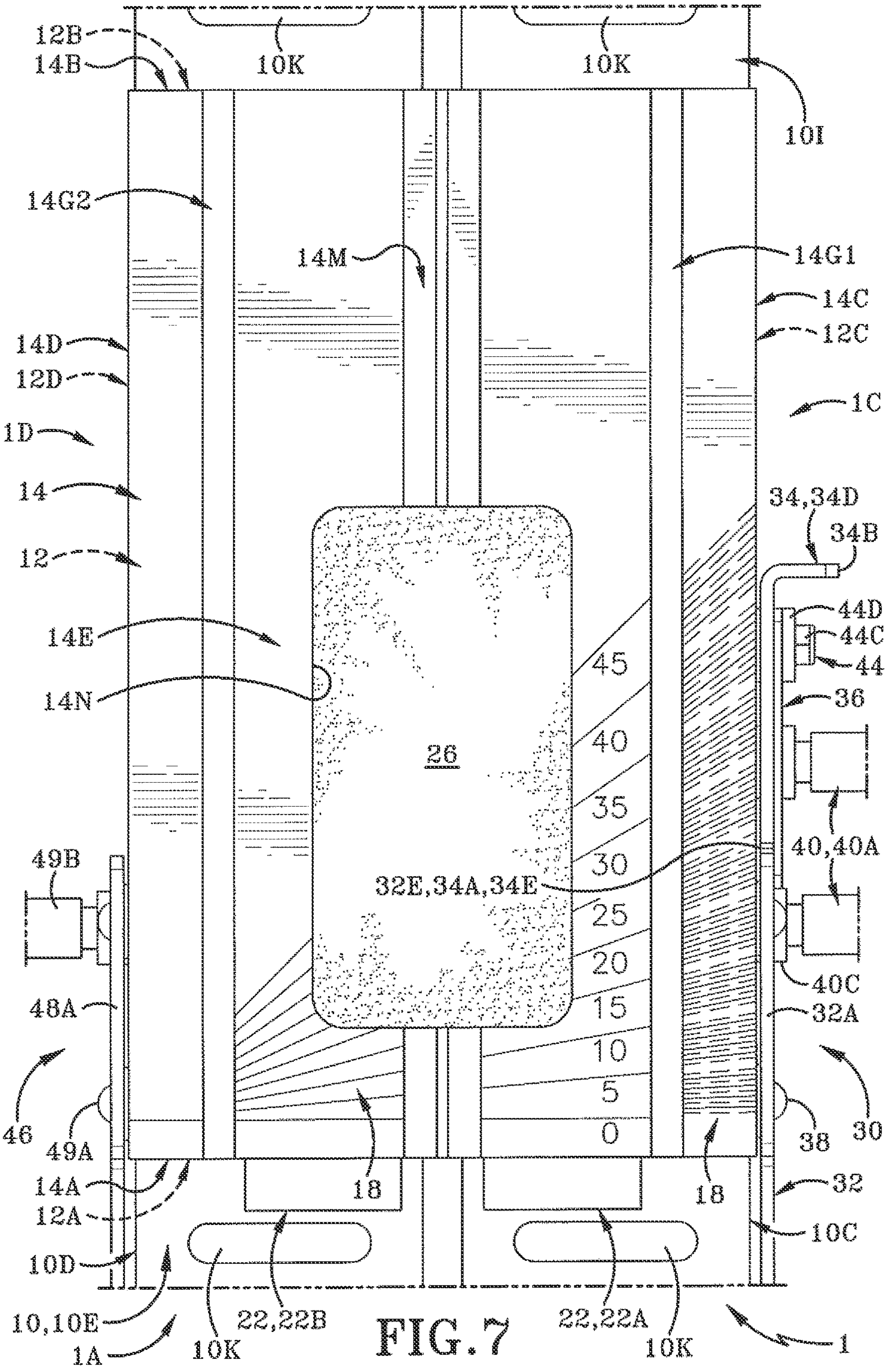
FIG. 7 (FIG. 7) is a partial top plan view of the machining jig.

Referring to FIGS. 2 and 7, the work table 14 includes an angle scale 18 provided on the outer surface 14E of the work table 14. The angle scale 18 defines a first set of angles where each marking in the angle scale 18 defines a one-degree increment for each angle in the set of first angles along the work table 14. In the illustrated embodiment, the first set of angles defined by the angle scale 18 is from about zero degrees up to about forty-five degrees at one-degree increments. Such use and purpose of the angle scale 18 is described in more detail below. Additionally, the angle scale 18 may include at least one set of measurement markings for designating at least one set of angles provided on the work table 14. In the illustrated embodiment, the angle scale 18 includes a first set of measurement markings that indicates one degree increments for the set of first angles and a second set of measurement markings that indicates one-half degree increments for the set of first angles.

Referring to FIGS. 5-6 and 8-9, at least one connecting mechanism 20 (e.g., a connector threadably engaged with a nut) operably engages the base table 12 with the riser 10. In the illustrated embodiment, the base table 12 operably engages with the riser 10 via a connector 20A of the at least one connecting mechanism 20. A head of the connector 20A operably engages with the base table 12 via the at least one inner channel 12H and the at least one attachment aperture 10N of the riser 10. A nut 20B threadably engages with the connector 20A of the at least one connecting mechanism 20 to maintain the base table 12 with the riser 10. In the illustrated embodiment, the machining jig 1 includes four connecting mechanisms 20 that operably engage the base table 12 with the riser 10.

The machining jig 1 also includes at least one hinge 22 that operably engages the base table 12 with the work table 14. As illustrated in FIGS. 2 and 5, the machining jig 1 includes a first hinge 22A and a second hinge 22B operably engaging the tables 12, 14 to one another. Such engagement allows the work table 14 to be selectively pivotably moveable relative to the base table 12 for drilling compound angles with a drill press, which is described in more detail below. The first hinge 22A and the second hinge 22B are identical to one another and are operably engaged with the base table 12 and the work table 14 in the same orientation at the front ends 14A of the tables 12, 14. Inasmuch as first hinge 22A and the second hinge 22B are identical to one another, the following description will relate to the first hinge 22A. It should be understood, however, that the description of the first hinge 22A applies equally to the second hinge 22B.

As illustrated in FIGS. 2 and 5, the first hinge 22A operably engages with the tables 12, 14 at the front ends 14A of the tables 12, 14 via fasteners 23. The fasteners 23 pass through through-holes 22C defined by the first hinge 22A and threadably engage with the threaded passageways 14L of the base table 12 and the work table 14 proximate to the second side channels 12K, 14K. The second hinge 22B operably engages with the tables 12, 14 identically to the first hinge 22A via fasteners 23. As such, the first and second hinges 22A, 22B allows the work table 14 to pivot and/or hinge at the first end 14A of the work table 14 to enable a woodworker to drill holes at compound angles into a workpiece, which is described in more detail below.

Figure 10A:
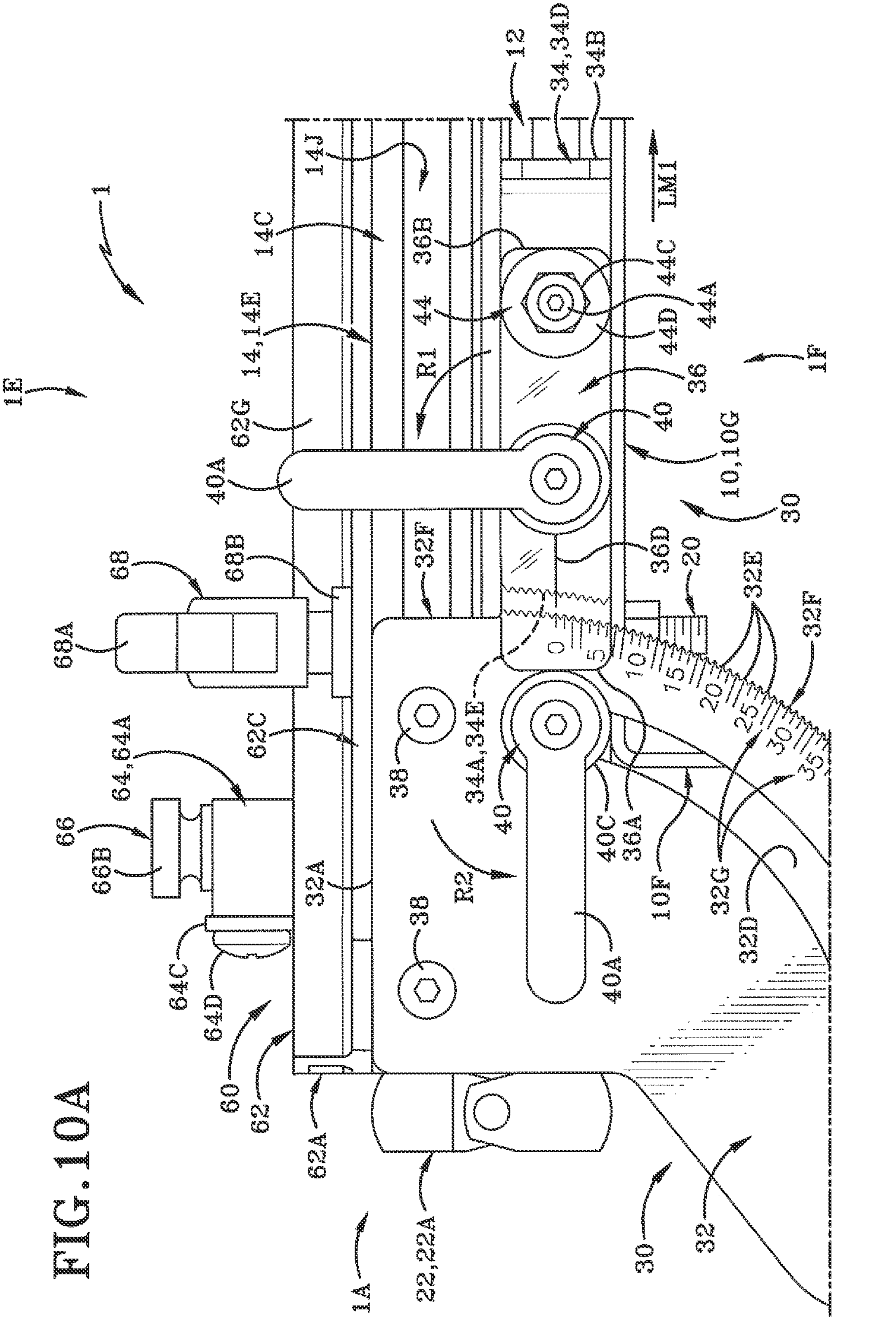
FIG. 10B (FIG. 10B) is an operational view of the machining jig similar to FIG. 10A, but the work table of the machining jig is pivoted away from the base table of the machining jig at a desired angle.
FIG. 10C (FIG. 10C) is an operational view of the machining jig similar to FIG. 10B, but selector of the adjustment assembly reengages with the protractor plate of the adjustment assembly to maintain the work table at the desired angle.
Figure 10B:
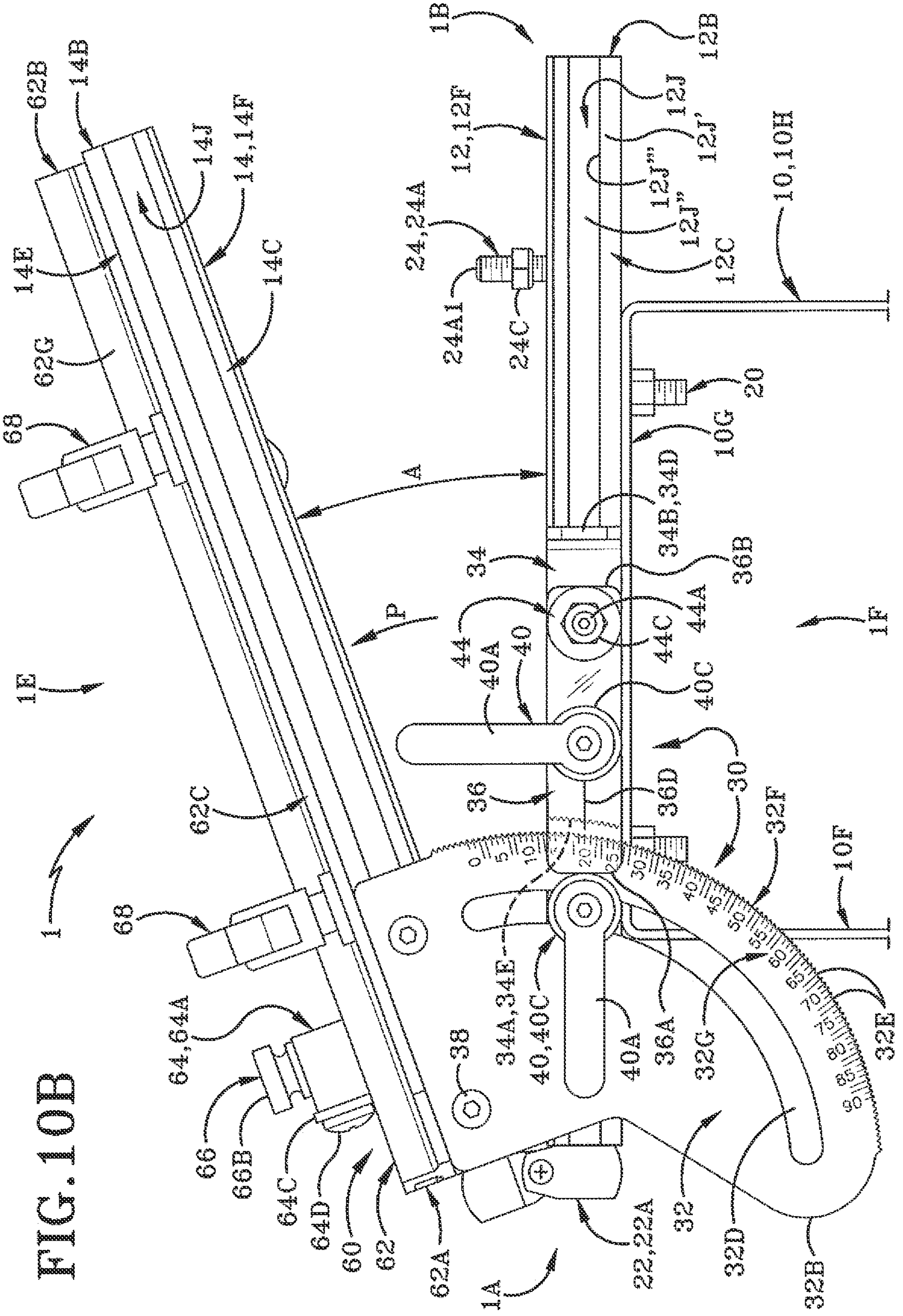
Figure 10C:
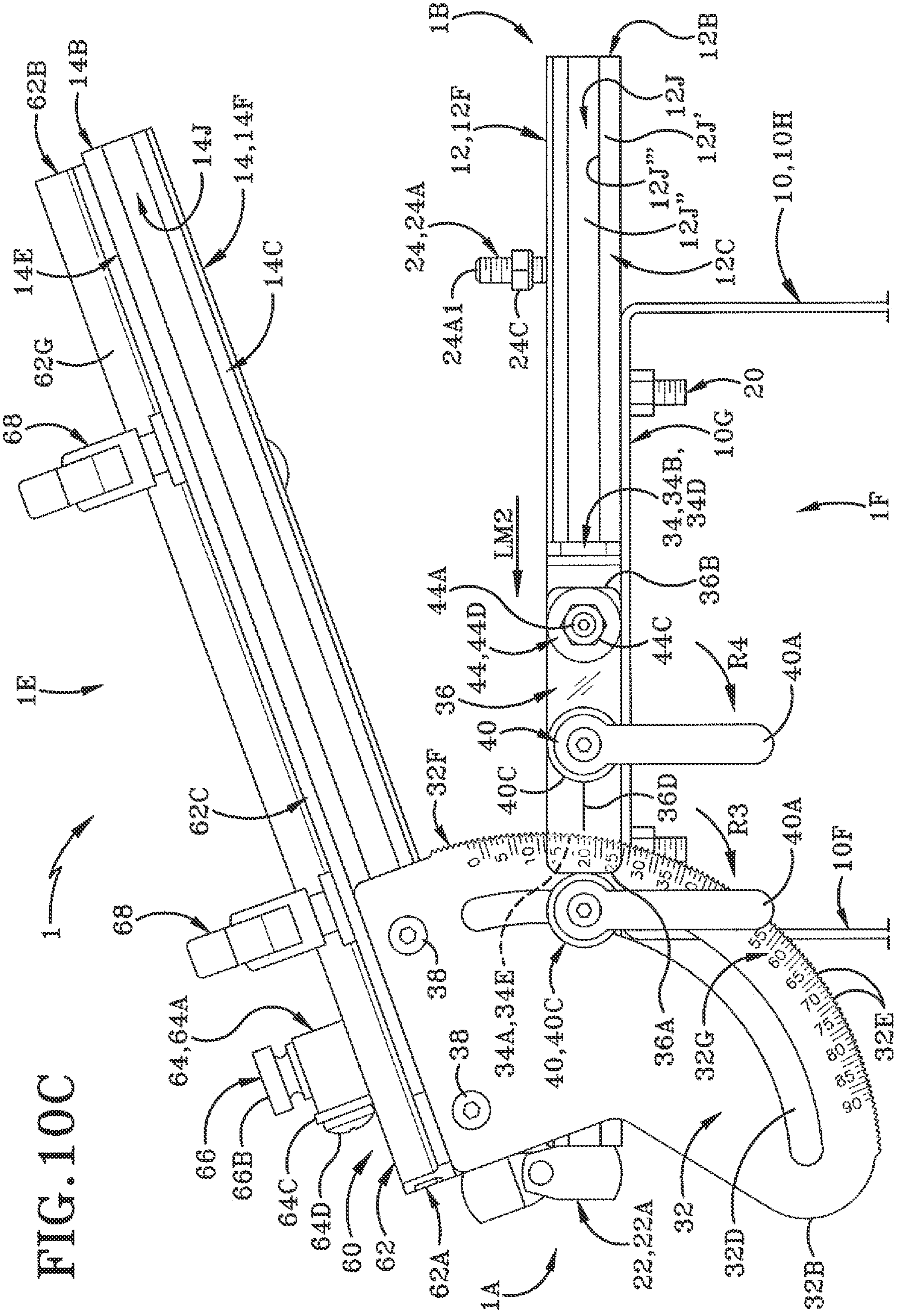
Figure 11:
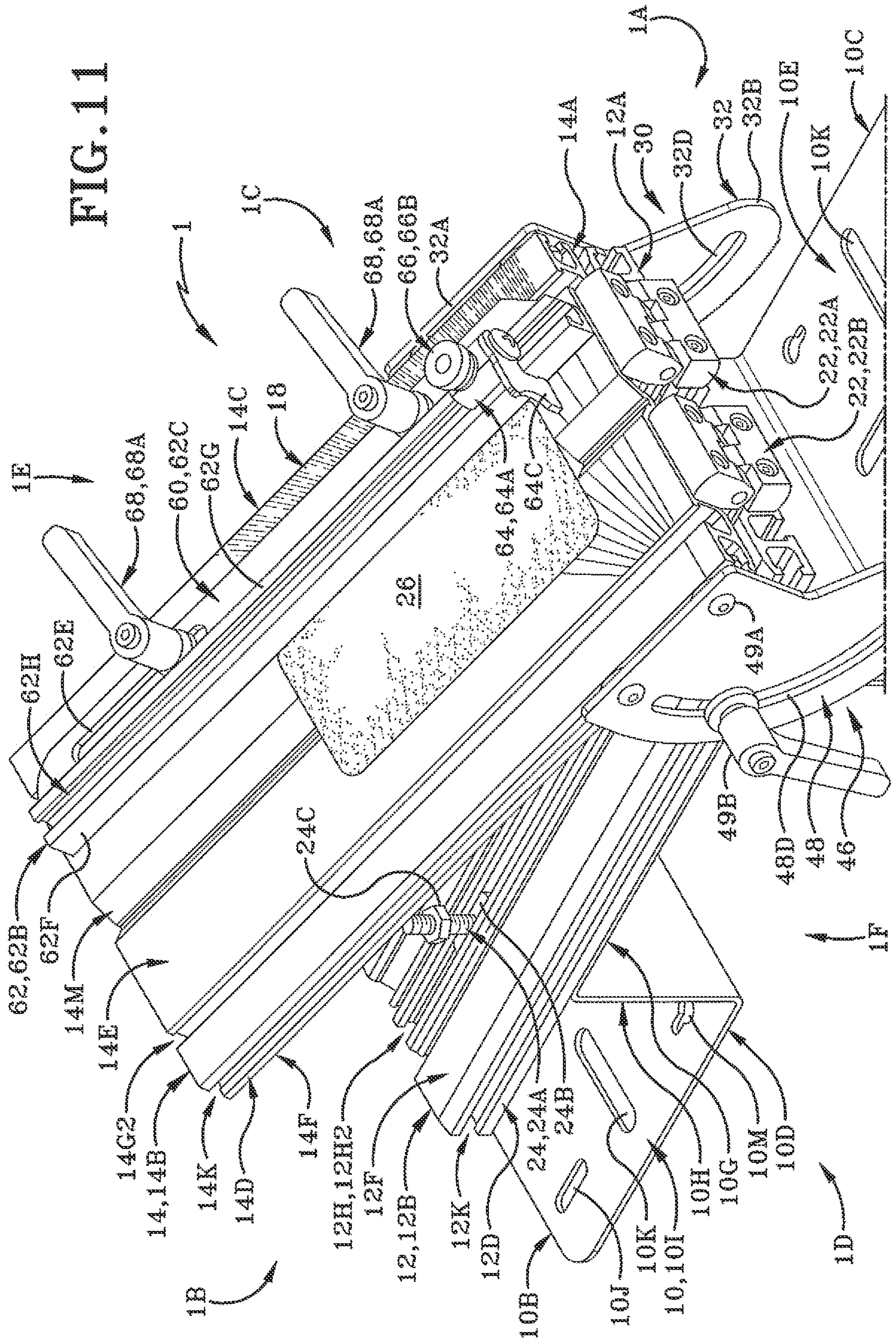
FIG. 11 (FIG. 11) is an operational view of the machining jig similar to FIG. 10C, but the fence assembly is operably engaged with the work table of the machining jig at the desired angle.

As illustrated in FIGS. 6, 10B, and 11, the machining jig 1 includes at least one standoff 24 that is operably engaged with one of the base table 12 and the work table 14. As illustrated in FIG. 6, the at least one standoff 24 is operably engaged with the base table 12 inside of the at least one inner channel 12H. The at least one standoff 24 includes a threaded shaft 24A that has a first end 24A1 and a second end 24A2. The threaded shaft 24A operably engages with an attachment nut 24B inside of the at least one inner channel 12H to maintain the threaded shaft 24A with the base table 12. Specifically, the second end 24A2 of the threaded shaft 24A directly abuts the lower wall 12H" inside of the at least one inner channel 12H, and the attachment nut 24B directly abuts the upper wall 12H' inside of the at least one inner channel 12H. The engagement between the threaded shaft 24A and the attachment nut 24B creates opposing force on the base table 12 inside of the at least one inner channel 12H to maintain the position of the at least one standoff 24.

Referring to FIGS. 6 and 10B, a limiting nut 24C is threadably engaged with the threaded shaft 24A to limit the position of the work table 14 relative to the base table 12. Specifically, the limiting nut 24C may be moveable along the threaded shaft 24A between the first and second ends 24A1, 24A2 so that the work table 14 is substantially parallel to the base table 12 when provided in a collapsed position (see FIGS. 1A, 2, 5-6, and 8-9). In the collapsed position, the limiting nut 24C contacts and directly abuts the inner surface 14F of the work table 14 to limit the downward movement of the work table 14. A portion of the threaded shaft 24A may pass through the slot 12G"' of the at least one inner channel 14H of the work table 14 and be disposed inside of the at least one inner channel 14H of the work table 14.

Referring to FIGS. 1A, 2, and 14A, the machining jig 1 may include a sacrificial insert 26. The sacrificial insert 26 is sized and configured to be housed inside of the central opening 14N of the work table 14 via attachment plates 28, which are described in more detail below. The sacrificial insert 26 enables a woodworker to drill into the machining jig 1 with the drill press or drilling device while not damaging the work table 14. In the illustrated embodiment, the sacrificial insert 26 is made of wood material which will not further damage or dull a drilling bit operatively engaged with a drill press during drilling operations. During drilling operations, a woodworker may remove and replace the sacrificial insert 26 with another new sacrificial insert when the previous sacrificial insert 26 no longer provides structural support to a workpiece. During other drilling operations, a woodworker may remove the sacrificial insert 26 from the work table 14 to allow the work table 14 to hold a rounded or curvilinear-shaped workpiece via the V-shaped groove 14M (see FIG. 14B).

As described above, the attachment plates 28 operably engage with the work table 14 to hold the sacrificial insert 26 with the work table 14. The attachment plates 28 also hold the sacrificial insert 26 flush with outer surface 14E of the work table 14. Each attachment plate 28 defines a set of first attachment holes 28A that extends entirely through each attachment plate 28 to allow a set of attachment mechanisms 29 (e.g., connectors threadably engaging with nuts) to operably engage the attachment plate 28 with the work table 14 below the central opening 14N (see FIG. 14B). Specifically, each connector 29A of the attachment mechanisms 29 operably engages with a respective attachment plate 28 and threadably engages with a nut 29B inside of the at least one inner channel 14H of the work table 14.

Referring to FIG. 14A, each attachment plate 28 also defines a set of second attachment holes 28B that extends entirely through each attachment plate 28 to allow a set of fasteners (e.g., screws and other components of the like) (not illustrated) to operably engage the sacrificial insert 26 with the attachment plates 28.

Referring to FIG. 3, the machining jig 1 includes an adjustment assembly 30. The adjustment assembly 30 operably engages with the base table 12 and the work table 14 to enable the work table 14 to be selectively pivotably adjustable to a desired angle from a range of predetermined angles relative to the base table 12. The woodworker will decide at what angle to set the work table 14 to relative to the base table 12 and will then utilize the adjustment assembly 30 to set the work table 14 at the desired selected angle. Additionally, the adjustment assembly 30 is configured to secure the work table 14 and the base table 12 to one another at a predetermined angle determined by the woodworker during a drilling project.

Still referring to FIG. 3, the adjustment assembly 30 includes a protractor plate 32. The protractor plate 32 has a first end or top end 32A and a second end or bottom end 32B opposite to the top end 32A. The protractor plate 32 defines a set of attachment openings 32C proximate to the top end 32A of the protractor plate 32. Each attachment opening or the set of attachment openings 32C extends entirely through the protractor plate 32; such use and purpose of the set of attachment openings 32C is described in more detail below. The protractor plate 32 also defines a curvilinear or arcuate slot 32D that arcuately extends between the top end 32A and the bottom end 32B and is defined vertically below the set of attachment openings 32C; such use and purpose of the set of attachment openings 32C is described in more detail below.

Still referring to FIG. 3, the protractor plate 32 also includes a set of indexing teeth 32E that extends away from an outermost end 32F of the protractor plate 32. As illustrated herein, the set of indexing teeth 32E is positioned adjacent to the arcuate slot 32D. The protractor plate 32 also has a set of angle indicia 32G that defines a range of angles for enabling the work table 14 to be set a predetermined angle relative to the base table 12, which is described in more detail below. In the illustrated embodiment, set of angle indicia 32G defines a range of angles from about zero degree up to about ninety degrees for pivotably adjusting the work table 14 relative to the base table 12. In the illustrated embodiment, each tooth of the set of indexing teeth 32E is arranged at one angle increments where each tooth of the set of indexing teeth 32E defines an angle from the range of angles set by the set of angle indicia 32G. Such use and operation of the protractor plate 32 is described in more detail below.

Still referring to FIG. 3, the adjustment assembly 30 also includes a selector 34. The selector 34 has a first end or front end 34A and a second end or rear end 34B opposite to the front end 34A. The selector 34 defines a set of securement openings 34C between the front end 34A and the rear end 34B. Each securement opening of the set of securement openings 34C that extends entirely through the selector 34; such use and purpose of the set of securement openings 34C is described in more detail below. A first securement opening 34C1 of the set of securement openings 34C is defined proximate to the front end 34A, and a second securement opening 34C2 of the set of securement openings 34C is defined proximate to the rear end 34B opposite to the first securement opening 34C1. The selector 34 also defines a handle 34D that extends from the rear end 34B towards the front end 34A. The handle 34D of the selector 34 enables a woodworker to longitudinally move the selector 34 along the base table 12 when operably engaged with said base table 12, which is described in more detail below.

Still referring to FIG. 3, the selector 34 also includes a set of selecting teeth 34E. The set of selecting teeth 34E extends radially away from the front end 34A of the selector 34. As illustrated herein, the set of selecting teeth 34E is complementary to the set of indexing teeth 32E of the protractor plate 32. As described in more detail below, the complementary arrangement between the set of indexing teeth 32E and the set of selecting teeth 34E allows the set of selecting teeth 34E of the selector 34 to operably meshes with the set of indexing teeth 32E of the protractor plate 32 to maintain the work table 14 at a predetermined angle relative to the base table 12 (see FIG. 10C). In other words, the set of selecting teeth 34E enables a woodworker to index the protractor plate 32 at a predetermined angle to maintain the work table 14 at said predetermined angle relative to the base table 12.

Still referring to FIG. 3, the adjustment assembly 30 also includes an indicator 36. The indicator 36 includes a first end or front end 36A and a second end or rear end 36B opposite to the front end 36A. The indicator 36 defines a set of mounting openings 36C between the front end 36A and the rear end 36B. Each mounting opening of the set of mounting openings 36C that extends entirely through the indicator 36; such use and purpose of the set of mounting openings 36C is described in more detail below. A first mounting opening 36C1 of the set of mounting openings 36C is defined proximate to the front end 36A, and a second mounting opening 36C2 of the set of mounting openings 36C is defined proximate to the rear end 36B opposite to the first mounting opening 36C1.

The indicator 36 also includes a pointer 36D that is positioned proximate to the front end 36A of the indicator 36. The pointer 36D enables a woodworker to align the pointer 36D with a desired angle from the set of angle indicia 32G so that the protractor plate 32 and the selector 34 mesh at the desired angle to maintain the work table 14 at said desired angle relative to the base table 12. Additionally, the indicator 36 is made from a transparent material and/or a material to enable a woodworker to see through the indicator 36 when selecting a desired angle and indexing the set of selecting teeth 34E of the selector 34 with the set of indexing teeth 32E of the protractor plate 32.

Still referring to FIG. 3, the adjustment assembly 30 also includes connecting mechanisms 38 to operably engage the protractor plate 32 with the work table 14. Each connecting mechanism 38 includes a threaded connector 38A that operably engages with a nut 38B to operably engage the protractor plate 32 with the work table 14. Specifically, the threaded connector 38A of each connecting mechanism 38 threadably engages with the nut 38B of each connecting mechanism 38 inside of the first side channel 14J of the work table 14 to operably engage the protractor plate 32 with the work table 14. Additionally, each connecting mechanism 38 may include a washer 38C that operably engages with the threaded connector 38A and is positioned between the protractor plate 32 and the work table 14. This structural configuration enables a woodworker to selectively adjust the work table 14 at a particular angle via the set of angle indicia 32G provided on the protractor plate 32.

Still referring to FIG. 3, the adjustment assembly 30 also includes adjustable lever mechanisms 40 to operably engage the protractor plate 32, the selector 34, and the indicator 36 to the base table 12 when the adjustable lever mechanisms 40 are provided in tightened positions. The adjustable lever mechanisms 40 also allow the protractor plate 32 and the selector 34 to be moveable relative to the base table 12 when the adjustable lever mechanisms 40 are provided in loosened positions (i.e., disengaged from the protractor plate 32 and the selector 34 while still be operably engaged with the base table 12 and the work table 14).

Still referring to FIG. 3, each adjustable lever mechanism 40 includes a threaded handle 40A that threadably engages with a nut 40B inside of the first side channel 12J of the base table 12 to operably engage the protractor plate 32 and the selector 34 with the work table 14. Each adjustable lever mechanism 40 also includes a bushing 40C that operably engages with the threaded handle 40A and is positioned between the threaded handle 40A and one of the protractor plate 32 and the selector 34. Each adjustable lever mechanism 40 also includes a washer 40D that operably engages with the threaded handle 40A and is positioned between the base table 12 and one of the protractor plate 32 and the selector 34. As illustrated in FIG. 1A, a first adjustable lever mechanism 40 operably engages with the protractor plate 32 via the curvilinear slot 32D, and a second adjustable lever mechanism 40 operably engages with the selector 34 via the first securement opening 34C1 of the set of securement openings 34C and the indicator via the first mounting opening 36C1 of the set of mounting openings 36C1. In the loosened position, the work table 14 and the protractor plate 32 are enabled to collectively pivot, via the at least one hinge 22, upwardly away from the first adjustable lever mechanism 40 (see FIG. 10A). In the loosened position, the selector 34 is able to longitudinally move along the base table 12 so the selector 34 is disengaged from the protractor plate 32 at a distance away from said protractor plate 32 (see FIG. 10A). In the tightened position, the work table 14 and the protractor plate 32 are collectively maintained at a desired angle relative to the base table 12 (see FIG. 10C). In the tightened position, the selector 34 is maintain and is unable to longitudinally move along the base table 12 so the selector 34 remains engaged with the protractor plate 32 to maintain the work table 14 and the protractor plate 32 at the desired angle relative to the base table 12 (see FIG. 10C).

Still referring to FIG. 3, the adjustment assembly 30 includes a locking mechanism 44 that operably engages the selector 34 and the indicator 36 to the base table 12. As illustrated in FIG. 1A, the locking mechanism 44 operably engages the selector 34 to the base table 12 via the second securement opening 34C2 of the set of securement openings 34C and operably engages the indicator 36 to the base table 12 via the second mounting opening 36C2 of the set of mounting openings 36C. The locking mechanism 44 includes a bolt 44A that operably engages with an inner nut 44B at a first end to operably engage the selector 34 and the indicator 36 with the base table 12. The locking mechanism 44 also includes an outer nut 44C that operably engaged with an opposing second end of the bolt 44A to maintain the selector 34 and the indicator 36 with the base table 12. The locking mechanism 44 also includes a bushing 44D that operably engages with the bolt 44A and operably engages with the selector 34 and the indicator 36 via the second securement opening 34C2 and the second mounting opening 36C2. The bushing 44D is positioned between the inner nut 44B and the outer nut 44C and positioned inside of the selector 34 and the indicator 36. The locking mechanism 44 may include a washer 44E that operably engages with the bolt 44A and is positioned between the selector 34 and the base table 12.

Referring to FIG. 8, the machining jig 1 also includes a locking plate assembly 46 operably engaged with the base table 12 and the work table 14 at a position opposite to the adjustment assembly 30 relative to the transverse axis of the machining jig 1. Similar to the adjustment assembly 30, the locking plate assembly 46 is configured to maintain the work table 14 at a desired angle relative to the base table 12. The locking plate assembly 46 also enables a woodworker to adjust the work table 14 at any desired angle from a range of angles offered by the locking plate assembly 46; the range of angles provided by the locking plate assembly 46 is substantially similar to the range of angles provided by the adjustment assembly 30. During woodworking projects, a woodworker may be enabled to use one or both of the adjustment assembly 30 and the locking plate assembly 46. In one instance, one of the adjustment assembly 30 and the locking plate assembly 46 may be used to maintain the work table 14 at a desired angle relative to the base table 12. In another instance, the adjustment assembly 30 and the locking plate assembly 46 may be collectively used to maintain the work table 14 at a desired angle relative to the base table 12. Such use and operation of the locking plate assembly 46 is described in more detail below.

Referring to FIG. 8, the locking plate assembly 46 includes a locking plate 48 substantially similar to the protractor plate 32 of the adjustment assembly 30. The locking plate 48 has a first end or top end 48A and a second end or bottom end 48B opposite to the top end 48A. The locking plate 48 defines a set of attachment openings 48C proximate to the top end 48A of the locking plate 48. Each attachment opening of the set of attachment openings 48C extends entirely through the locking plate 48; such use and purpose of the set of attachment openings 48C is described in more detail below. The locking plate 48 also defines a curvilinear or arcuate slot 48D that arcuately extends between the top end 48A and the bottom end 48B and is defined vertically below the set of attachment openings 48C; such use and purpose of the set of attachment openings 48C is described in more detail below. In comparison to the protractor plate 32, the locking plate 48 omits a set of teeth (such as the set of indexing teeth 32E) and a set of angle indicia (such as the set of angle indicia 32G). As such, an additional measuring tool may be used with the locking plate 48 for setting the work table 14 at an angle not provided by the set of angle indicia 32G of the protractor plate 32.

Still referring to FIG. 8, the locking plate assembly 46 also includes connecting mechanisms 49A for operably engaging the locking plate 48 with the work table 14. In the illustrated embodiment, the connecting mechanisms 49A operably engage the locking plate 48 with the work table 14 via the attachment openings 48C. The connecting mechanisms 49A also operably engage with the work table 14 inside of the second side channel 14K proximate to the first end 14A of the work table 14. The connecting mechanisms 49A of the locking plate assembly 46 are substantially similar to the connecting mechanisms 38 of the adjustment assembly 30.

Still referring to FIG. 8, the locking plate assembly 46 also includes an adjustable lever mechanism 49B for operably engaging the locking plate 48 with the base table 12. In the illustrated embodiment, the adjustable lever mechanism 49B operably engages the locking plate 48 with the base table 12 via the curvilinear slot 48D. The adjustable lever mechanism 49B also operably engages with the base table 12 inside of the second side channel 12K proximate to the first end 12A of the base table 12. The adjustable lever mechanism 49B of the locking plate assembly 46 is substantially similar to the adjustment lever mechanisms 40 of the adjustment assembly 30. The adjustable lever mechanism 49B may be provided in a loosened position and a tightened position relative to the locking plate 48. In the loosened position, the work table 14 and the locking plate 48 are collectively moveable where the work table 14 and the locking plate 48 may be pivoted upwardly via the at least one hinge 22. In this position, the adjustable lever mechanism 49B is disengaged from the locking plate 48 while still being engaged with the base table 12. In the tightened position, the work table 14 and the locking plate 48 are collectively moveable where the work table 14 and the locking plate 48 are maintained at a desired angle relative to the base table 12. In this position, the adjustable lever mechanism 49B is engaged with the locking plate 48 to prevent movement of the locking plate 48 and the work table 14 relative to the base table 12.

The machining jig 1 may include a fence assembly 60 that operably engages with the work table 14. The fence assembly 60 is configured to provide additional support for the woodworker when a workpiece is introduced to the work table 14. In one instance, the fence assembly 60 may directly abut a straight edge of a workpiece to prevent said workpiece from shifting or rotating when a drill press drills a hole into said workpiece. In another instance, the fence assembly 60 may be used with additional woodworking tools and/or components for maintaining a workpiece on the work table 14 of the machining jig 1 during woodworking projects; such use of additional woodworking tools and/or components with the fence assembly 60 is described in more detail below.

Figure 4:
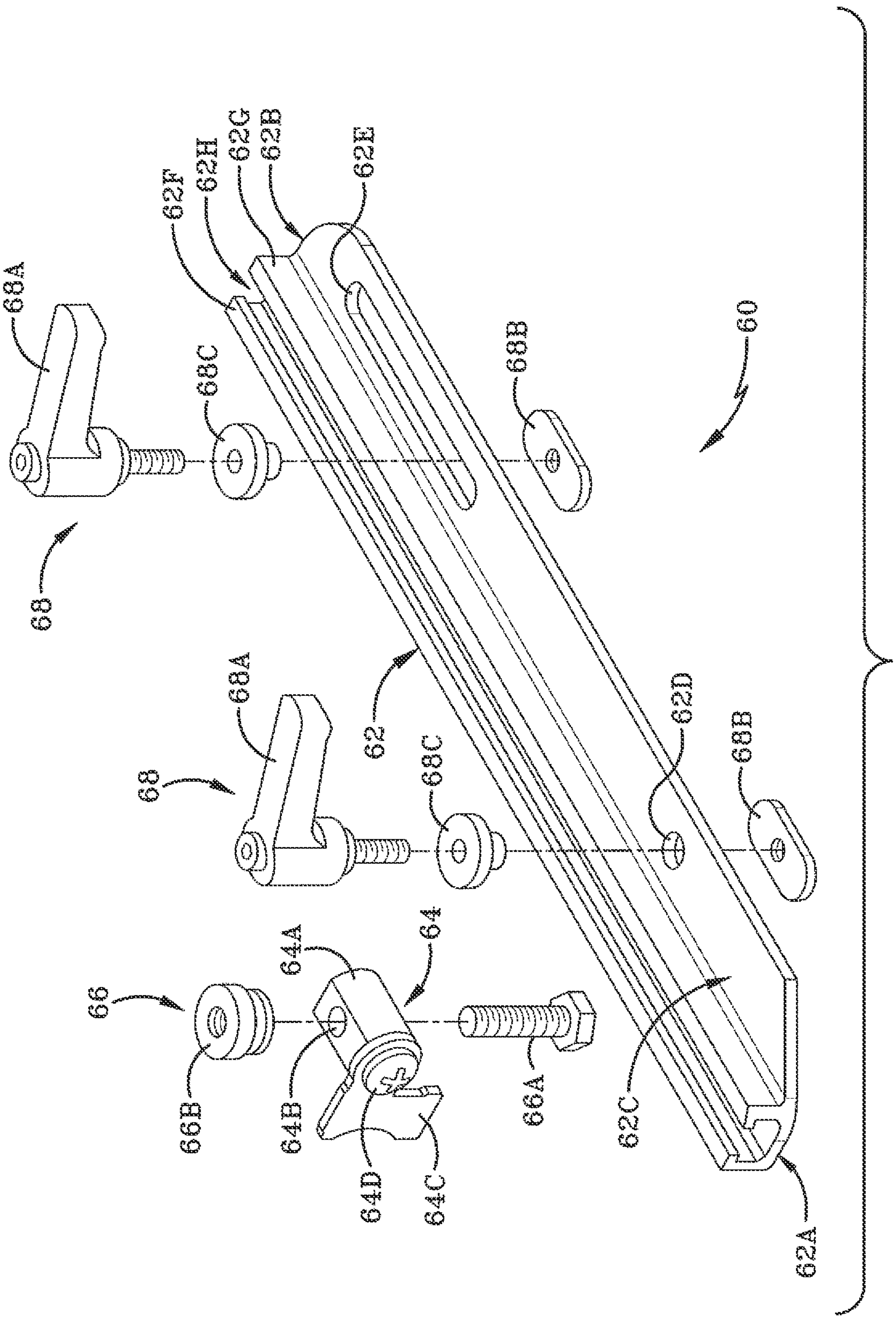
FIG. 4 (FIG. 4) is an exploded, isometric perspective view of the fence assembly.

As illustrated in FIG. 4, the fence assembly 60 includes a fence 62. The fence 62 includes a first or front end 62A, a second or rear end 62B that is opposite to the front end 62A, and a longitudinal axis defined therebetween. The fence 62 includes a plate 62C that extends from the front end 62A to the rear end 62B along the longitudinal axis. The plate 62C defines an attachment opening 62D at a location between the front and rear ends 62A, 62B proximate to the front end 62A. The attachment opening 62D also extends entirely through the plate 62C. The plate 62C also defines an attachment slot 62E at a location between the front and rear end 62A, 6B proximate to the rear end 62B. The attachment slot 62E also extends entirely through the plate 62C. Such uses and purposes of the attachment opening 62D and the attachment slot 62E are described in more detail below.

Still referring to FIG. 4, the fence 62 also includes a first rail 62F that extends upwardly from the plate 62C and is positioned between the front end 62A and the rear end 62B of the fence 62. During woodworking projects, the first rail 62F and the plate 62C may operably engage a first outermost end of a workpiece when said workpiece is introduced to the machining jig 1 (see FIG. 12A). The fence 62 also includes a second rail 62G that extends upwardly from the plate 62C and is positioned between the front end 62A and the rear end 62B of the fence 62 (see FIG. 12A). The second rail 62G is positioned adjacent to the first rail 62F relative to a transverse axis of the fence 62. The first rail 62F and the second rail 62G collectively define a T-shaped channel 62H that extends along the entire length of the fence 62 from the front end 62A to the rear end 62B. Such uses and purposes of the first rail 62F and the second rail 62G are described in more detail below.

Still referring to FIG. 4, the fence assembly 60 also includes at least one flip stop 64 that operably engages with the fence 62. Specifically, the at least one flip stop 64 operably engages with the first rail 62F and the second rail 62G on the fence 62 where the at least one flip stop 64 is moveable along the first rail 62F and the second rail 62G, which is described in more detail below. The at least one flip stop 64 is configured to operably engage a second outermost end of the workpiece that is orthogonal to the first outermost end of the workpiece operably engaged with the plate 62C and the second rail 62G (see FIG. 12A). In the illustrated embodiment, a single flip stop 64 is provided in the fence assembly 60. The flip stop 64 may also be omitted from the fence assembly 60 if desired by a woodworker based on the woodworking project (e.g., the size, shape, or configuration of a workpiece, the types of woodworking tools and/or components used with the fence, and other suitable workpiece characteristics of the like).

Still referring to FIG. 4, the flip stop 64 includes a housing 64A. The housing 64A defines a through-hole 64B that extends entirely through the housing 64A along a vertical axis of the housing 64A. The flip stop 64 also includes a stop arm 64C that operably engages with the housing 64A via a connector 64D. The stop arm 64C is rotatable about the longitudinal axis of the connector 64D between an up position and a down position. In the up position, the stop arm 64C is rotated upwardly away from the fence 62 where the stop arm 64C is free from contacting or engaging a workpiece. In the down position, the stop arm 64 is rotated downwardly towards the fence 62 where the stop arm 64C contacts and engages the second outermost end of the workpiece (see FIG. 12A).

Still referring to FIG. 4, the fence assembly 60 includes a connecting mechanism 66 that operably engages the flip stop 64 with the fence 62. Specifically, the connecting mechanism 66 operably engages the housing 64A of the flip stop 64 with the first and second rails 62F, 62G of the fence 62. The connecting mechanism 66 includes a bolt 66A that threadably engaged with a thumb nut 66B to operably engage the flip stop 64 to the fence 62. Once assembled, the head of the bolt 66A operably engages with the first rail 62F and the second rail 62G inside of the T-shaped channel 62H. The shaft of the bolt 66A passes through the T-shaped channel 62H and the flip stop 64 (via the through-hole 64B) which then operably engages with the thumb nut 66B. During woodworking projects, a woodworker may loosen the thumb nut 66B from the bolt 66A to enable the woodworker to move the flip stop 64 to a desired position on the first and second rails 62F, 62G while the flip stop 64 is still operably engaged with the first and second rails 62F, 62G. The woodworker may then tighten the thumb nut 66B to the bolt 66A until the flip stop 64 is secured to the first and second rails 62F, 62G.

Still referring to FIG. 4, the fence assembly 60 includes adjustable lever mechanisms 68 that are substantially similar to the adjustable lever mechanism described and illustrated herein (e.g., adjustable lever mechanisms 40, 49B). Each adjustable lever mechanism 68 includes a threaded handle 68A that threadably engages with a nut 68C inside of one of the outer channels 14G of the work table 14 to operably engage the fence 62 with the work table 14. Each adjustable lever mechanism 68 also includes a nut 68C that operably engages with the threaded handle 68A and is positioned between the threaded handle 68A and the fence 62. The adjustable lever mechanisms 68 operably engages the fence 62 with the work table 14 via the attachment opening 62D and the attachment slot 62E of the fence 62 and at least one outer channel 14G of the work table 14.

During woodworking projects, a woodworker may engage the adjustable lever mechanism 68 with at least one outer channel 14G where the fence 62 may be arranged in various orientations on the work table 14 based on various considerations, including the size, shape, and configuration of the workpiece, the angle of drilling a hole into a workpiece, and other various considerations of the like. In one instance, the adjustable lever mechanisms 68 may be operably engaged in a single outer channel 14G of the work table 14 (such as the first outer channel 14G1) where the fence 62 is aligned parallel with the single outer channel 14G and the longitudinal axis of the machining jig 1 (see FIGS. 1A and 11). In another instance, a first adjustable lever mechanism 68 may be operably engaged with work table 14 inside of the first outer channel 14G1 and a second adjustable lever mechanism 68 may be operably engaged with the work table 14 inside of the second outer channel 14G2. In this instance, the fence 62 may be oriented orthogonal to the first and second outer channels 14G1, 14G2 or may be oriented to a desired angle on the work table 14 via the angle scale 18. Such operation of the fence assembly 60 with the work table 14 is described in more detail below.

Figure 1B:
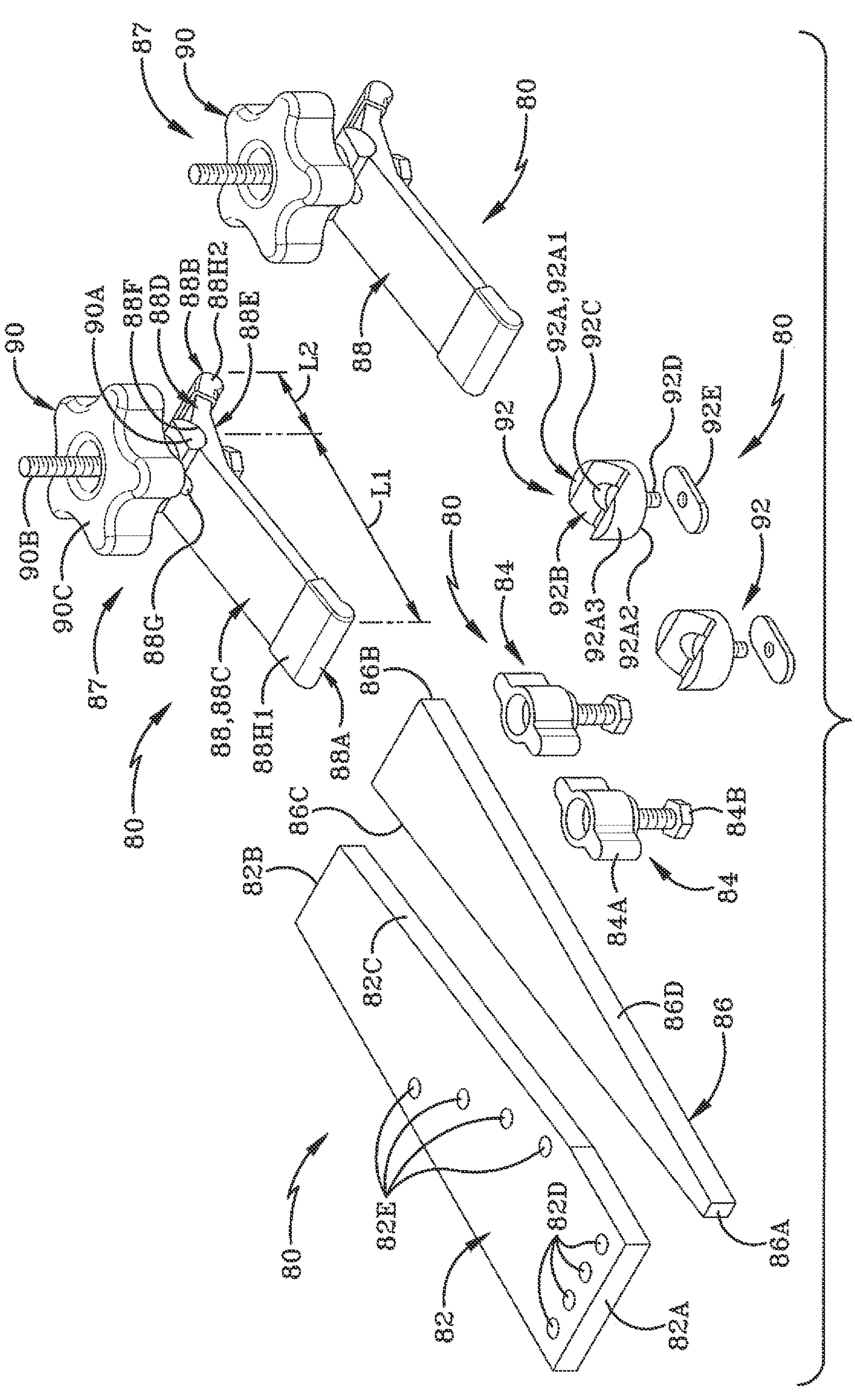
FIG. 1B (FIG. 1B) is an isometric perspective view of the clamping system in accordance with an aspect of the present disclosure.

Referring to FIG. 1B, the machining jig 1 may also include a clamping system 80. The clamping system 80 may include at least one or more components and/or devices for clamping and securing a workpiece to the machining jig 1 for drilling purposes. Specifically, at least one or more components and/or devices of the clamping system 80 may be used for clamping and securing a workpiece to the work table 14 of the machining jig 1. As described in more detail below, any suitable number of components and devices of the clamping system 80 may be used with together for clamping and securing a workpiece to the work table 14 of the machining jig 1.

Still referring to FIG. 1B, the clamping system 80 includes a fixed wedge 82. As described in more detail below, the fixed wedge 82 operably engages with the work table 14 at a desired fixed position. The fixed wedge 82 includes a first or front end 82A and a second or rear end 82B that is opposite to the front end 82A. The fixed wedge 82 also has a tapered wall 82C that extends between the front end 82A and the rear end 82B. The tapered wall 82C tapers inwardly as the tapered wall 82C extends from the front end 82A to the rear end 82B. Such use and purpose of the tapered wall 82C is described in more detail below.

Still referring to FIG. 1B, the fixed wedge 82 also defines a set of first attachment openings 82D that extend entirely through the fixed wedge 82. The set of first attachment openings 82D are defined proximate to the front end 82A of the fixed wedge 82; such use and purpose of the set of first attachment openings 82D is described in more detail below. The fixed wedge 82 also defines a set of second attachment openings 82E that extend entirely through the fixed wedge 82. The set of second attachment openings 82E are defined diagonally along the fixed wedge between the front end 82A and the second end 82B of the fixed wedge 82; such use and purpose of the set of second attachment openings 82E is described in more detail below.

Still referring to FIG. 1B, the clamping system 80 also includes at least one fly nut mechanism 84. The at least one fly nut mechanism 84 operably engages the fixed wedge 82 with the work table 14 at a desired fixed position via one of the set of first attachment openings 82D and the set of second attachment openings 82E. In the illustrated embodiment, the clamping system 80 includes two fly nut mechanisms 84 for operably engaging the fixed wedge 82 with the work table 14 at the desired fixed position.

Figure 12A:
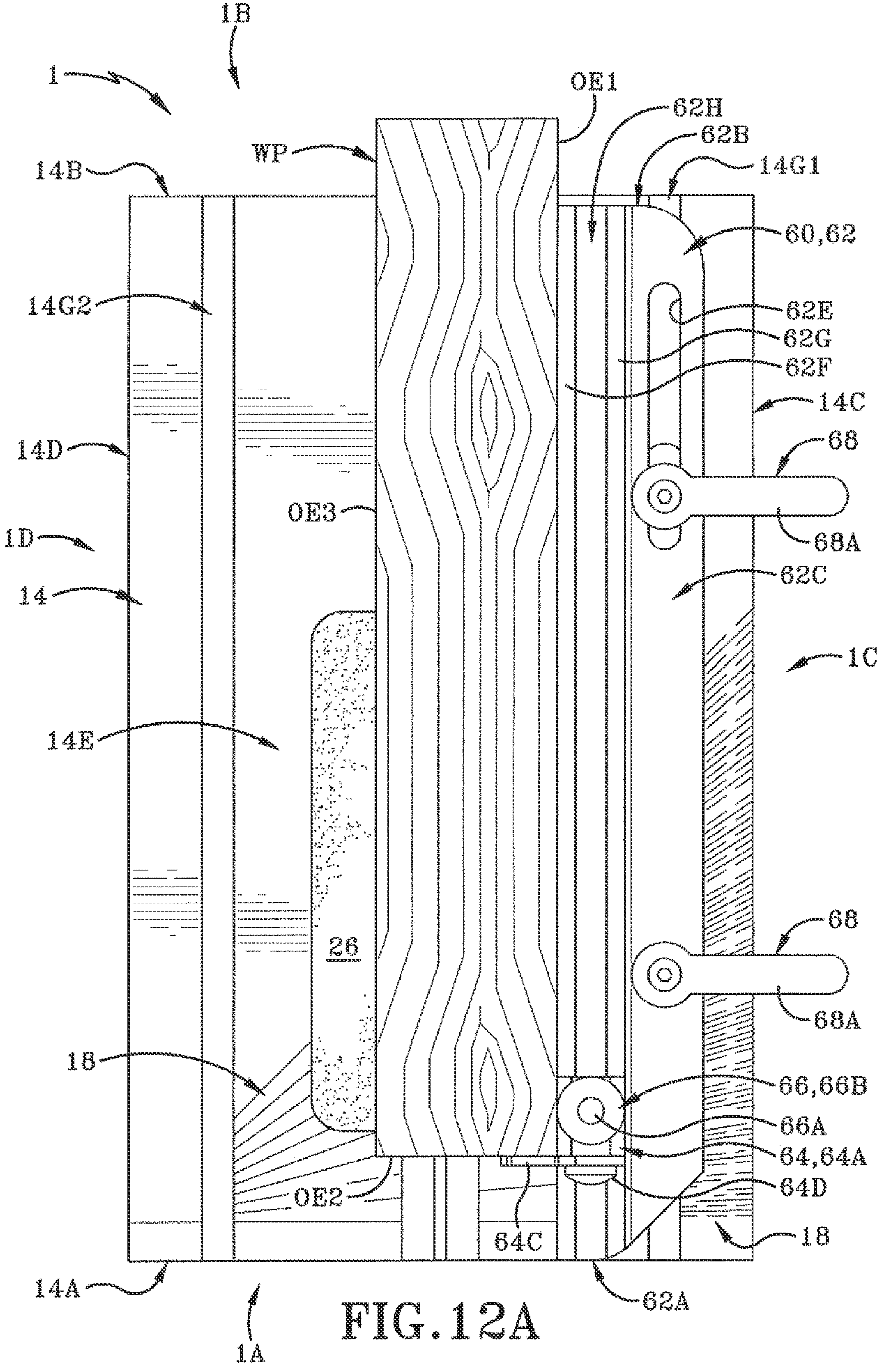
FIG. 12A (FIG. 12A) is an operational view of the machining jig operably engaged with the fence assembly, wherein a workpiece is operably engaged with a fence of the fence assembly and a flip stop of the fence assembly.
Figure 12B:
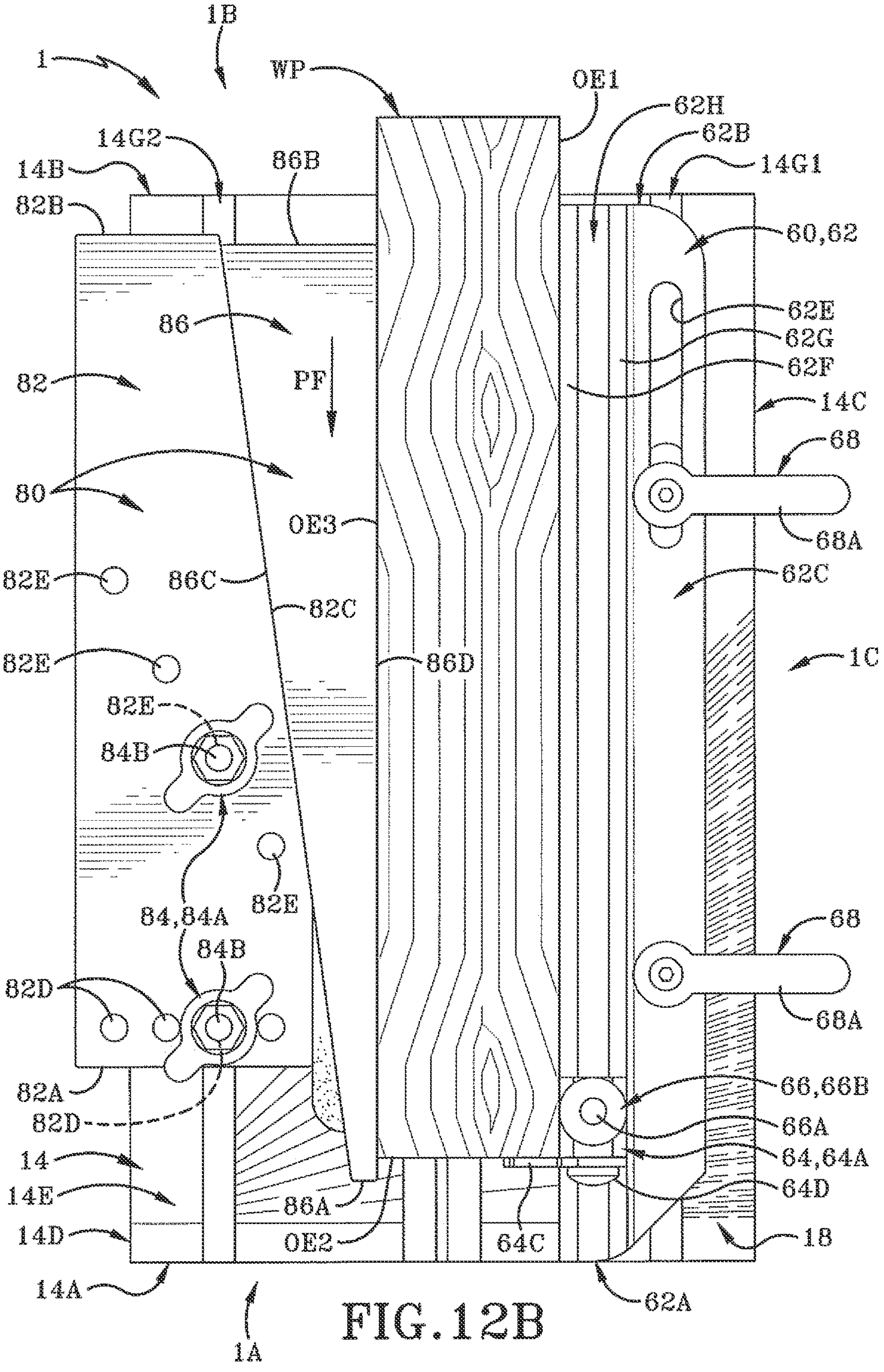
FIG. 12B (FIG. 12B) is an operational view similar to FIG. 12A, but a fixed wedge and a moveable wedge of the clamping system are operably engaged with the work table of the machining jig and are operably engaged with the workpiece.

The at least one fly nut mechanism 84 has a fly nut 84A that threadably engages with a bolt 84B. As illustrated in FIG. 12B, the bolt 84B of the at least one fly nut mechanism 84 operably engages the fixed wedge 82 with the work table 14. Specifically, the bolt 84B operably engages the fixed wedge 82 inside an attachment opening of the set of first attachment openings 82D or the set of second attachment openings 82E, and the head of the bolt 84B is configured to operably engaged with the work table 14 inside of the at least one outer channel 14G (specifically with the upper wall 14G' of the at least one outer channel 14G). The fly nut 84A of the at least one fly nut mechanism 84 threadably engages with bolt 84B to secure the bolt 84B to a desired fixed position with the work table 14 (see FIG. 12B). Such use and operation of the at least one fly nut mechanism 84 is discussed in more detail below.

The clamping system 80 also includes a moveable wedge 86. As described in more detail below, the moveable wedge 86 operably engages with the fixed wedge 82 at the desired fixed position by wedging and/or jamming the moveable wedge 86 between the fixed wedge 82 and a workpiece (see FIG. 12B). Such interaction between the fixed wedge 82 and the moveable wedge 86 secures the workpiece on the work table 14 in combination with a fence assembly (e.g., fence assembly 60), which is also described in more detail below.

Still referring to FIG. 1B, the moveable wedge 86 includes a first or front end 86A and a second or rear end 86B that is opposite to the front end 86A. The moveable wedge 86 also has a tapered wall 86C that extends between the front end 86A and the rear end 86B. The tapered wall 86C tapers inwardly as the tapered wall 86C extends from the rear end 86B to the front end 86A. The tapered wall 86C of the moveable wedge 86 is configured to operably engage with the tapered wall 82C of the fixed wedge 82 for enabling a woodworker to secure a workpiece between the fence 62 of the fence assembly 60 and the movable wedge 86 of the clamping system 80 via a wedging and/or jamming force (see FIG. 12B). The moveable wedge 86 also has a planar or straight wall 86D that is positioned opposite to the tapered wall 86C. The planar wall 86D extends between the front end 86A and the rear end 86B. The planar wall 86D is configured to operably engage with an outermost end of a workpiece that is also substantially planar and/or straight.

The structural configuration between the fixed wedge 82 and the moveable wedge 86 on a work table 14 is considered advantageous at least because this configuration enables a woodworker to hammer and/or strike the moveable wedge 86 between the workpiece and the fixed wedge 82 until the tapered walls 82C, 86C restrict the movement of the moveable wedge 86 along the fixed wedge 82. The configuration of the fixed wedge 82 and the moveable wedge 86 also is considered advantageous at least because this configuration enables a woodworker to secure various types of workpiece to the work table 14 without rearranging and/or reconfiguring the machining jig 1 between woodworking project; as such, the moveable wedge 86 may be the only tool and/or component that is be readjusted between each woodworking projects.

The clamping system 80 may also include at least one pivot clamp 87. The at least one pivot clamp 87 is configured to operably engaged with the work table 14 to clamp and secure various types of workpiece to said work table 14. Specifically, the at least one pivot clamp 87 is configured to operably engage with a surface of a workpiece for clamping and securing said workpiece to the work table 14. The at least one pivot clamp 87 is also configured to be pivotably moveable on the work table 14 once operably engaged with the work table 14; such pivot movement of the at least one pivot clamp 87 is described in more detail below.

Referring to FIG. 1B, the at least one pivot clamp 87 includes a pivot plate 88 that has a first end 88A, a second end 88B opposite to the first end 88A, and a longitudinal axis defined therebetween. The pivot plate 88 also includes a first clamp portion 88C that extends from the first end 88A towards the second end 88B with a first length "L1". The pivot plate 88 also includes a second clamp portion 88D that extends from the first clamp portion 88C to the second end 88B with a second length "L2"; the first length "L1" of the first clamp portion 88C is greater than the second length "L2" of the second clamp portion 88D. As illustrated in FIG. 1B, the pivot plate 88 defines a bend 88E that differentiates the first clamp portion 88C and the second clamp portion 88D from one another. As such, the bend 88E orients the first clamp portion 88C at an angle relative to the second clamp portion 88D. Such angle created by the bend 88E allows the pivot plate 88 to provide downwardly clamping force onto a surface of a workpiece during woodworking projects; such clamping force of the pivot plate 88 is described in more detail below.

Still referring to FIG. 1B, the pivot plate 88 also defines a cavity 88F at the bend 88E and between the first clamp portion 88C and the second clamp portion 88D; such use of cavity 88F is described in more detail below. The cavity 88F is also defined along an axis that is orthogonal to the longitudinal axis of the pivot plate 88. The pivot plate 88 also defines a slit 88G at the bend 88E and between the first clamp portion 88C and the second clamp portion 88D; such use of the slit 88G is also described in more detail below. The slit 88G is defined along an axis that is parallel with the longitudinal axis of the pivot plate 88 and orthogonal to the cavity 88F. The cavity 88F and the slit 88G intersect one another and are in fluid communication with one another.

Still referring to FIG. 1B, the pivot plate 88 also includes a first cover 88H1 that operably engages with the first clamp portion 88C at the first end 88A. The pivot plate 88 also includes a second cover 88H2 that operably engages with the second clamp portion 88D at the second end 88B. The first and second covers 88H1, 88H2 may provide additional grip for the pivot plate 88 when clamping and securing a workpiece to the work table 14. The first and second covers 88H1, 88H2 may also prevent marring or damage to the workpiece and/or the work table 14 when the pivot plate 88 clamps and secures said workpiece to the work table 14.

The clamping system 80 also includes at least one locking knob assembly 90 that operably engages with the pivot plate 88. In the illustrated embodiment, a single locking knob assembly 90 operably engages with a single pivot plate 88. The locking knob assembly 90 is configured to operably engage the pivot plate 88 with the work table 14 for clamping and securing a workpiece to the work table 14. Upon assembly, the locking knob assembly 90 is configured to be provided between a loosened position and a tightened position for enabling and restricting movement of the pivot plate 88 on the work table 14. As such, the locking knob assembly 90 allows the pivot plate 88 to pivot and/or rotate about the locking knob assembly 90 (in the loosened position) for clamping and securing a workpiece at a desired position.

Referring to FIG. 1B, the locking knob assembly 90 includes a nut 90A. The nut 90A operably engages with the pivot plate 88 inside of the cavity 88F. The nut 90A is configured to threadably engage with a bolt 90B of the locking knob assembly 90. The head of the bolt 90B is configured to operably engage with the upper wall 14G' one of the outer channels 14G of the work table 14. The bolt 90B is also configured to move through the slit 88G defined by the pivot plate 88. During operation, the bolt 90B enables the pivot plate 88 to rotate about the longitudinal axis of the bolt 90B and to pivot on the bolt 90B via the slit 88G. The bolt 90B is also configured to threadably engaged with an adjustment knob 90C. The adjustment knob 90C is rotatably moveable along the bolt 90B (via rotational forces) to enable a woodworker to tighten the pivot plate 88 to the work table 14 or to loosen the pivot plate 88 from the work table 14.

The clamping system 80 also includes at least one button stop 92. The at least one button stop 92 is configured to operably engaged with the work table 14. Specifically, the at least one button stop 92 is configured to operably engaged with the work table 14 via one of the outer channels 14G. The at least one button stop 92 is also configured to operably engage with an outermost end of a workpiece for securing the workpiece to the work table 14. In one instance, the at least one button stop 92 is configured to operably engage with an outermost end of a rounded or curvilinear-shaped workpiece for securing the workpiece to the work table 14 (see FIG. 15B).

Referring to FIG. 1B, the at least one button stop 92 includes a bench dog 92A. The bench dog 92A defines a first or top end 92A1, a second or bottom end 92A2 opposite to the top end 92A1, and a circumferential wall 92A3 that extends between the top end 92A1 and the bottom end 92A2. The bench dog 92A defines a V-shaped groove 92B that extends into the bench dog 92A from the top end 92A1 towards the bottom end 92A2. The V-shaped groove 92B is configured to enable the bench dog 92A to hold and secure a rounded or curvilinear-shaped workpiece (e.g., a dowel, rod, etc.) when a drill press is drilling a hole into the curvilinear-shaped workpiece. The bench dog 92A also defines a through-hole 92C that extends from V-shaped groove 92B to the bottom end 92A2 of the bench dog 92A. The through-hole 92C is sized and configured to receive a connector 92D of the at least one button stop 92. The connector 92D is configured to threadably engage a nut 92E of the at least one button stop 92 to operably engage the bench dog 92A with the work table 14. Upon assembly, the nut 92E operably engages with the upper wall 14G' of at least one outer channel 14G and threadably engages with the connector 92D to secure the bench dog 92A with the work table 14 (see FIGS. 15A-15B). Such operation of the at least one button stop 92 is described in more detail below.

Any combination of components or devices of the clamping system 80 may be used simultaneously when clamping and securing a workpiece to the work table 14. For example, at least one pivot clamp (e.g, the at least one pivot clamp 87) and at least one button stop (e.g., the at least one button stop 92) of a clamping system may be operably engaged with a work table of a machining jig simultaneously for clamping and securing a rounded or curvilinear-shaped workpiece to the machining jig. Additionally, any combination of components or devices of the clamping system 80 may be simultaneously used with the fence assembly 60 when clamping and securing a workpiece to the work table 14

Having now described the components and devices of the machining jig 1, methods of using the machining jig 1 with the fence assembly 60 and/or the clamping system 80 is described in more detail below.

Prior to adjusting the work table 14 relative to the base table 12, a woodworker may operably engage the pair of tables 12, 14 with the riser 10 in at least one orientation based on the desired drilling angle. As illustrated in FIGS. 1A and 2, the pair of tables 12, 14 are operably engaged with the riser 10 in a first orientation where the first ends 14A of the pair of tables 12, 14 are facing towards the front end 1A of the machining jig 1 and are vertically above the first foot 10E. Once provided in the first orientation, the base table 12 may be operably engaged with the riser 10 via connecting mechanisms 20. Specifically, each connecting mechanism 20 operably engage the base table 12 with the riser 10 via the attachment apertures 10N defined by the platform 10G and the first and second inner channels 14H1, 14H2 of the base table 12 (see FIG. 6).

While not illustrated herein, a woodworker may operably engage the pair of tables 12, 14 with the riser 10 in any suitable orientation based on the woodworking project. In one instance, a woodworker may operably engage the pair of tables 12, 14 with the riser 10 in a second orientation where the first ends 14A of the pair of tables 12, 14 is facing towards the first side 1C of the machining jig 1 and positioned between the first and second feet 10E, 10I. In another instance, a woodworker may also operably engage the pair of tables 12, 14 with the riser 10 in a third orientation where the first ends 14A of the pair of tables 12, 14 is facing towards the second end 1B of the machining jig 1 and positioned proximate to the second foot 10I. In another instance, a woodworker may also operably engage the pair of tables 12, 14 with the riser 10 in a fourth orientation where the first ends 14A of the pair of tables 12, 14 is facing towards the second side 1D of the machining jig 1 and positioned between the first and second feet 10E, 10I.

Once assembled, the woodworker may then pivot the work table 14 to a desired angle relative to the base table 12. In order to pivot the work table 14 away from the base table 12, the woodworker disengages the selector 34 from the protractor plate 32 (see FIG. 10A) by loosening the adjustable lever mechanism 40 from the selector 34. Specifically, the woodworker applies a rotational force on the threaded handle 40A of the adjustable lever mechanism 40 to loosen the handle 40A from the selector 34. The rotational force applied on the handle 40A of the adjustable lever 40 is denoted by an arrow labeled "R1" in FIG. 10A. Once loosened, the woodworker may apply a linear pulling force on the selector 34, via the handle 34D, until the selector 34 disengages from the protector plate 32 (i.e., the set of selecting teeth 34E are disengaged from the set of indexing teeth 32E). The linear pulling force applied on the handle 34D of the selector 34 is denoted by an arrow labeled "LM1" in FIG. 10A. Prior to or subsequent to the disengagement of the protractor plate 32 and the selector 34, the woodworker loosens the threaded handle 40A of the adjustable lever mechanism 40 from the protractor plate 32 via a rotational force on said threaded handle 40A of said adjustable lever mechanism 40. The rotational force applied on the handle 40A of the adjustable lever 40 is denoted by an arrow labeled "R2" in FIG. 10A.

Upon disengagement of the protractor plate 32 and the selector 34, the woodworker may then pivot the work table 14 away from base table 12 to a desired selected angle "A" (see FIG. 10B) by applying a pivoting force on the work table 14. The pivoting force of the work table 14 away from the base table 12 is denoted by an arrow labeled "P" in FIG. 10B. During movement of the work table 14, the pointer 36D of the indicator 36 enables the woodworker to precisely adjust the work table 14 to the desired angle "A" relative to the base table 12. As discussed above, the woodworker may pick any suitable angle in the set of angle indicia 32G defined by the protractor plate 32 at increments of one degree. As illustrated in FIG. 10B, the desired angle "A" at which the work table 14 is positioned relative to the base table 12 is twenty degrees. While not illustrated herein, the woodworker may also select any angle in the set of angle indicia 32G defined by the protractor plate 32 that is not indexed in the set of angle indicia 32G while still being in the range of the set of angle indicia 32G (e.g., adjusting the work table 14 to twenty and one-half degrees relative to the base table 12).

Once the desired angle "A" has been selected, the woodworker then secures the work table 14 at the desired angle "A" by tightening the handle 40A of the adjustable lever mechanism 40 with the protractor plate 32. Specifically, the woodworker applies a rotational force on the handle 40A of the adjustable lever mechanism 40 to secure the work table 14 and the protractor plate 32 with one another via the adjustable lever mechanism 40. The rotational force on the handle 40A of the adjustable to secure work table 14 and the protractor plate 32 with one another is denoted by an arrow labeled "R3" in FIG. 10C.

Prior to or subsequent to securing the work table 14 and the protractor plate 32 with one another, the woodworker may mesh the set of selecting teeth 34E of the selector 34 with the set of indexing teeth 32E of the protractor plate 32. Specifically, the woodworker applies a linear pushing force against the selector 34, via the handle 34D, until the set of selecting teeth 34E of the selector 34 meshes with the set of indexing teeth 32E of the protractor plate 32. The linear pushing force applied on the handle 34D of the selector 34 is denoted by an arrow labeled "LM2" in FIG. 10C. Once the first and second sets of teeth 32E, 34E are meshed, the woodworker then tightens the handle 40A of the adjustable lever mechanism 40 against the selector 34 by applying a rotational force on said handle 40A. By tightening the handle 40A against the selector 34, the selector 34 is secured to base table 12 via the adjustable level mechanism 40. The rotational force applied on the handle 40A of the adjustable lever mechanism 40 to secure the selector 34 with the base table 12 is denoted by an arrow labeled "R4" in FIG. 10C.

While the tables 12, 14 were adjusted after being operably engaged with the riser 10, any suitable method and/or techniques may be used by a woodworker for orienting and adjusting a machining jig 1 for a woodworking project. While not illustrated herein, the woodworker may adjust the work table 14 at a desired angle prior to operably engaging the tables 12, 14 with the riser 10.

While not illustrated herein, the woodworker may also use the locking plate assembly 46 to provide additional support and securement to secure the work table 14 at the desired angle "A" relative to the base table 12. While not illustrated herein, the woodworker may omit the use of the adjustment assembly 30 and solely relay on the locking plate assembly 46 to secure the work table 14 at the desired angle "A" relative to the base table 12. Such use of only the locking plate assembly 46 may be viable when a desired angle is not indexable by the adjustment assembly 30 (e.g., adjusting a work table to about twenty and one-half degrees relative to a base plate).

As illustrated in FIGS. 11-14, the woodworker may desire to use the fence assembly 60 along with certain components and devices of the clamping system 80 for a woodworking project. Prior to introducing a workpiece to the machining jig 1, the woodworker may operably engage the fence 62 of the fence assembly 60 with the work table 14 via one or both of the first and second outer channels 14G1, 14G2, which is described in more detail below. Prior to introducing a workpiece to the machining jig 1, the woodworker may also operably engage certain components of the clamping system 80 with the work table 14 via one of both of the first and second outer channels 14G1, 14G2, which is also described in more detail below.

As illustrated in FIG. 11, the fence 62 of the fence assembly 60 operably engages with the first outer channel 14G1 of the work table 14 via the adjustable lever mechanisms 68. During assembly, the nuts 68C of the adjustable lever mechanisms 68 are inserted into the first outer channel 14G1 at one of the first end 14A and second end 14B of the work table 14. Once inside, the woodworker may then tighten each threaded handle 68A of the adjustable lever mechanisms 68 with the associated nut 68C to secure the fence 62 with the work table 14. As such, the threaded handle 68A and the bushing 68B of each adjustable lever mechanism 68 engage with the fence 62, and the nut 68C of each adjustable lever mechanism engages with the upper wall 14G' inside of the first outer channel 14G1. Additionally, the woodworker may operably engage at least one flip stop 64 with the fence 62 via the connector 64D. As illustrated in FIG. 11, a single flip stop 64 is operably engaged with the fence 62. In other exemplary embodiments, any suitable number of flip stops of a fence assembly may be operably engaged with a fence of the fence assembly.

Once the fence assembly 60 is engaged with the work table 14, the woodworker may introduce a workpiece "WP" to the machining jig 1. As illustrated in FIG. 12A, a first outermost end "OE1" of the workpiece "WP" directly abuts the first rail 62F of the fence 62. Still referring to FIG. 12A, a second outermost end "OE2" of the workpiece "WP" directly abuts the stop arm 64C of the flip stop 64 where the second outermost end "OE2" is orthogonal to the first outermost end "OE1".

Once the workpiece "WP" is held by the fence assembly 60, the woodworker may operably engage the fixed wedge 82 with the work table 14 via the fly nut mechanisms 84. As illustrated in FIG. 12B, the fixed wedge 82 is operably engaged with the work table 14 via the second outer channel 14G2 where the fixed wedge 82 opposes the fence 62 on the work table 14. Specifically, the head of the bolt 84B of each fly nut mechanism 84 operably engages with the upper wall 14G' inside of the second outer channel 14G2 of the work table 14 when the fly nut 84A secures with the bolt 84B. Additionally, the fly nut 84A of each fly nut mechanism 84 is tightened against the fixed wedge 82 at an attachment opening of one of the first and second sets of attachment openings 82D, 82E. As illustrated in FIG. 12B, a first fly nut mechanism 84 is provided with the fixed wedge 82 at an attachment opening of the first set of attachment openings 82D for operably engaging the fixed wedge 82 with the work table 14. Additionally, a second fly nut mechanism 84 is provided with the fixed wedge 82 at an attachment opening of the second set of attachment openings 82E for operably engaging the fixed wedge 82 with the work table 14.

Once the fixed wedge 82 is operably engaged with the work table 14, the woodworker may then introduce the moveable wedge 86. As illustrated in FIG. 12B, the moveable wedge 86 is positioned between fixed wedge 82 and the workpiece "WP". Once positioned, the tapered wall 86C of the moveable wedge 86 operably engages with the tapered wall 82C of the fixed wedge 82, and the planer wall 86D of the moveable wedge 86 operably engages with a third outermost end "OE3" of the workpiece "WP". In order to secure the workpiece "WP" with the fence assembly 60 and the fixed and moveable wedges 82, 86 of the clamping system 80, the woodworker applies a pushing linear force on the moveable wedge 86 towards the first ends 14A of the tables 12, 14. The pushing linear force asserted on the moveable wedge 86 by the woodworker may be applied by hand or by use of another woodworking tool operated by the woodworker (i.e., a mallet, a hammer, or other tools of the like). The pushing linear force asserted on the moveable wedge 86 by the woodworker is denoted by an arrow labeled "PF" in FIG. 12B. The woodworker may continue this force on the moveable wedge 86 until the tapered walls 82C, 86C prevent movement of the moveable wedge 86 or the workpiece "WP" is adequately secured and fixed between the moveable wedge 86 and the fence 62.

Figure 12C:
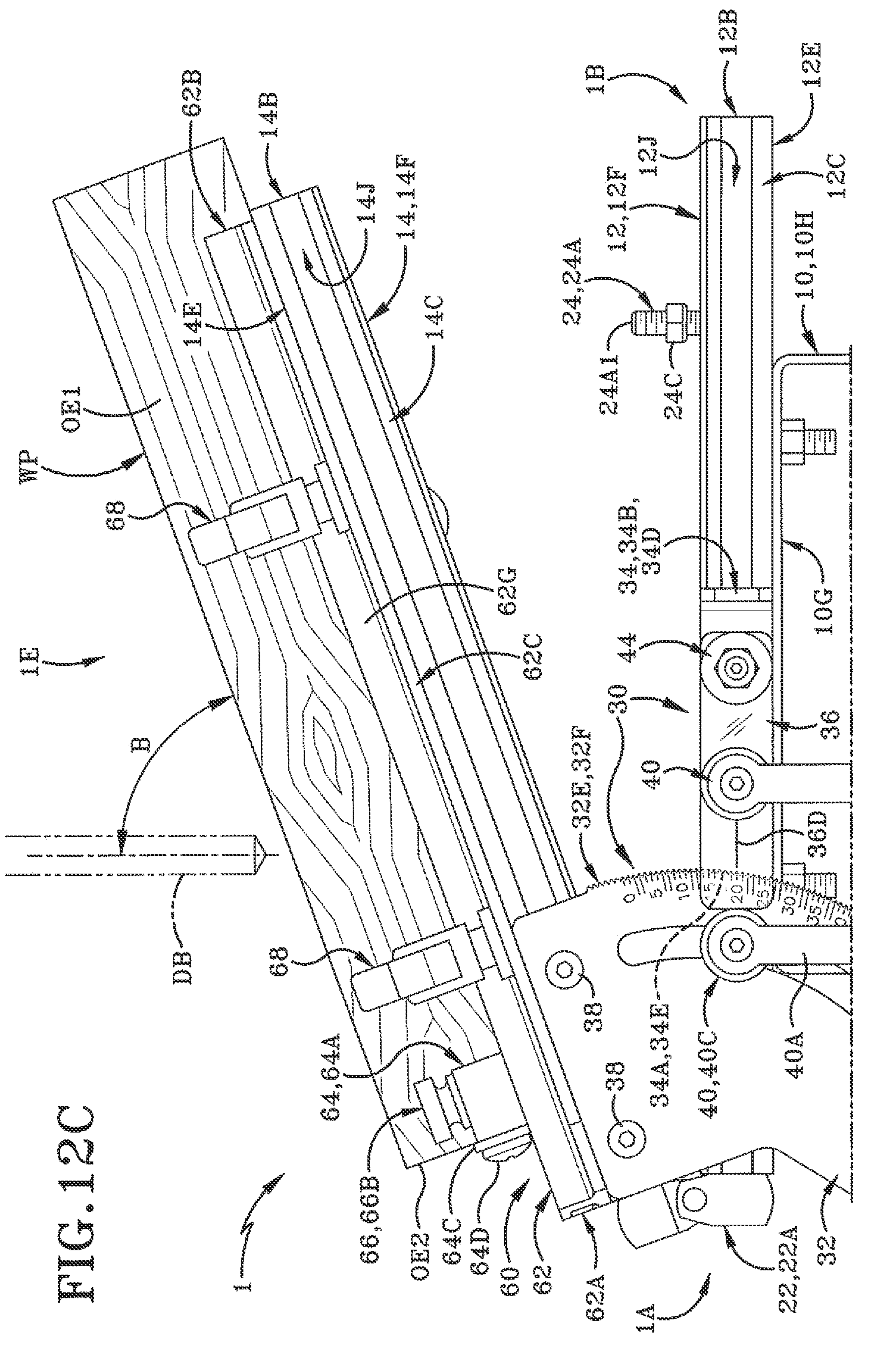
FIG. 12C (FIG. 12C) is an operational view similar to FIG. 12B, but a drill bit of a drill press is introduced to the workpiece and the machining jig to drill a hole in the workpiece at the desired angle.

As illustrated in FIG. 12C, the workpiece "WP" is secured at the desired angle "A" via the displacement of the work table 14 relative to the base table 12. As such, a drill bit "DB" of a drill press is enabled to drill and/or bore a hole into the workpiece "WP" at a drilling angle "B" where the drilling angle "B" is congruent with the desired angle "A". Once the drilling operation is complete for the woodworking project, the woodworker may simply remove the moveable wedge 86 from the machining jig 1 to release the workpiece "WP" from the machining jig 1. This process may be repeated for various types of workpiece that may be wedged and/or secured between the fence assembly 60 and the clamping system 80 as illustrated in FIGS. 12A-12B.

Figure 13A:
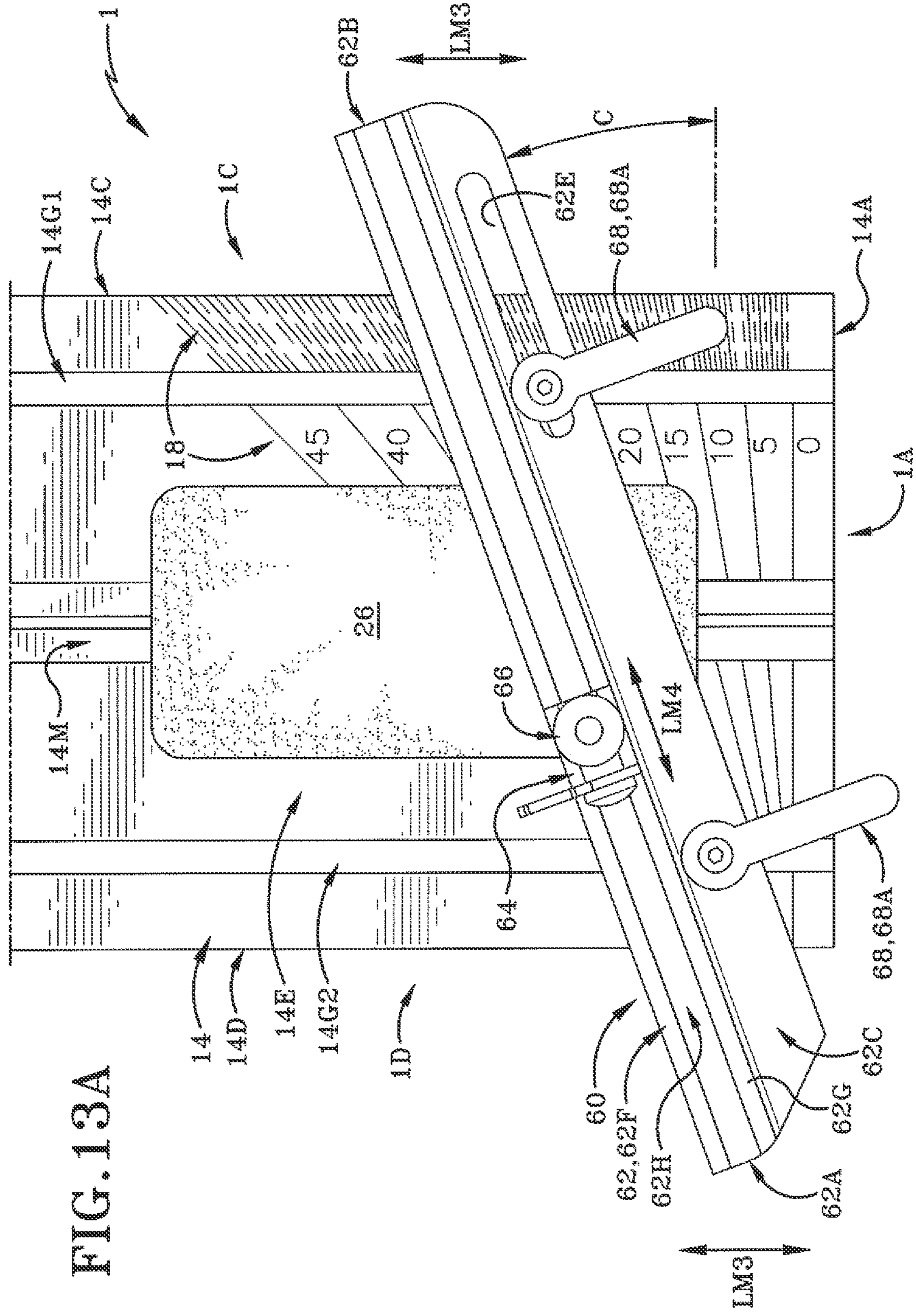
FIG. 13A (FIG. 13A) is an operational view of the machining jig operably engaged with the fence assembly, wherein the fence of the fence assembly is provided at a desired angle relative to the work table of the machining jig and provided at a first orientation relative to the work table.
Figure 13B:
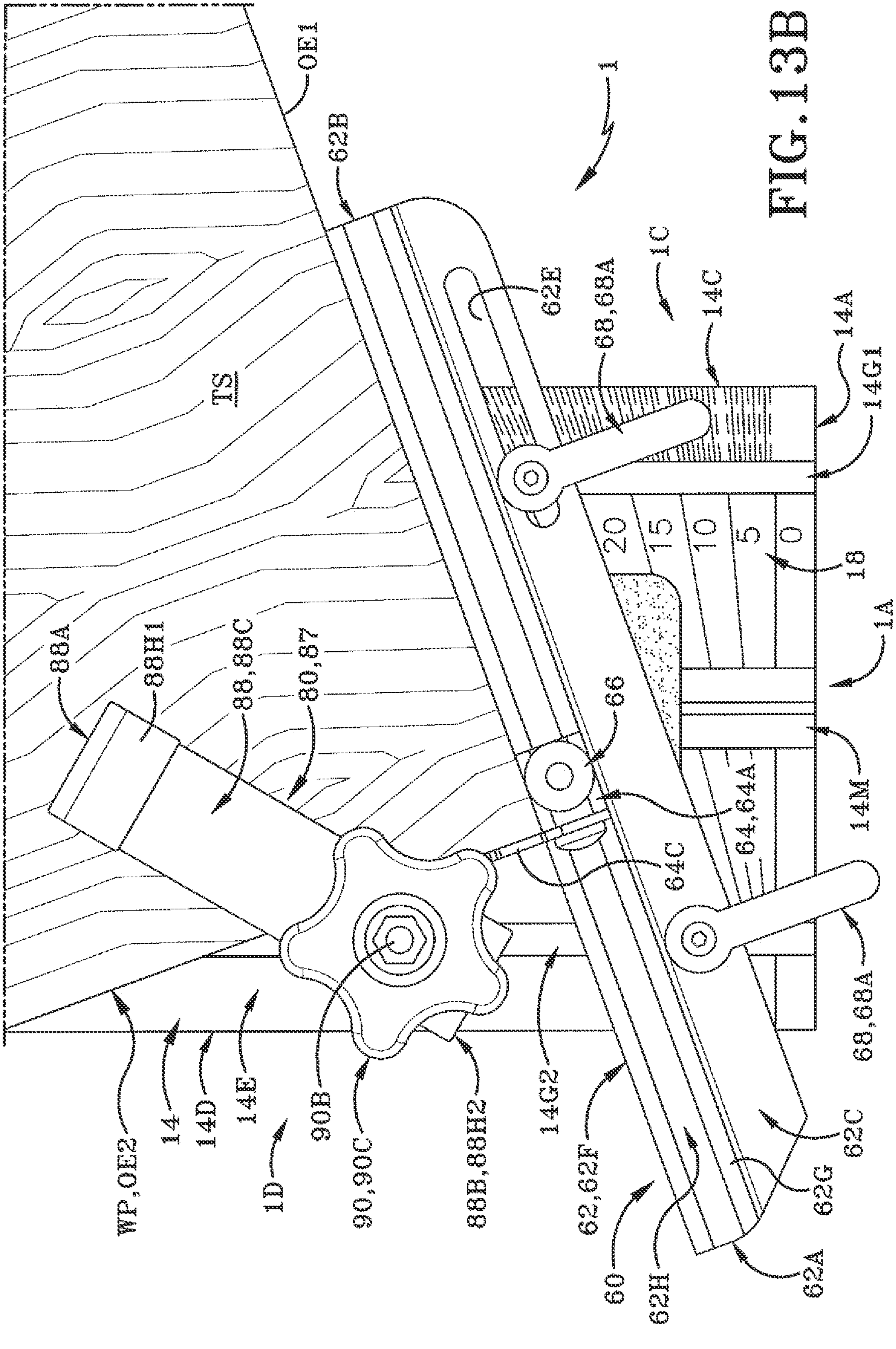
FIG. 13B (FIG. 13B) is an operational view similar to FIG. 13A, but at least one pivot clamp of the clamping system operably engages with the work table of the machining jig, wherein the fence and the at least one pivot clamp operably engage with a workpiece.

As illustrated in FIGS. 13A-13B, the woodworker may also operably engage the fence 62 of the fencing assembly 60 at a desired angle relative to the work table 14 via the angle scale 18. During a woodworking project, the woodworker may desire a compound drilling angle where the work table 14 is adjusted at a first angle relative to the base table 12 (i.e., selected angle "A" as shown in FIG. 10B), and the fence 62 is adjusted at a second angle "C" (FIG. 13A) relative to the work table 14. Second angle "C" may be different to the first angle, i.e., selected angle "A".

As illustrated in FIG. 13A, the woodworker may operably engage the fence 62 with the work table 14 via both the first outer channel 14G1 and the second outer channel 14G2. The woodworker may first operably engage a portion of the fence 62 with the first outer channel 14G1 of the work table 14 via one of the adjustable lever mechanism 68. The woodworker may then operably engage another portion of the fence 62 with the second outer channel 14G2 of the work table 14 via another adjustable lever mechanism 68. Once the adjustable lever mechanisms 68 operably engage with the work table 14, the fence 62 may move and/or slide along the first and second outer channels 14G1, 14G2 between the first and second ends 14A, 14B of the work table 14. Such linear movement applied on the fence 62, via the woodworker, is denoted by double arrows labeled "LM3" as shown in FIG. 13A. As shown, the woodworker positions the fence 62 at an angle "C" relative to the first end 14A of the work table 14 by rotating the second end 62B towards the second end 14B of the work table 14 while maintaining the first end 62A proximate to the first end 14A. The woodworker may cease movement and/or rotation of the fence 62 once the woodworker has determined the angle "C" for the fence 62 via assistance from the angle scale 18. As illustrated in FIG. 13A, the angle "C" of the fence 62 is about twenty degrees relative to the zero-degree marker of the angle scale 18 and/or the first end 14A of the work table 14. The fence 62 is then secured to the work table 14 via tightening of the adjustable lever mechanisms 68 against the fence 62.

Additionally, the flip stop 64 is longitudinally moveable along the first and second rails 62F, 62G of the fence 62. The longitudinal movement of the flip stop 64 is denoted by double arrows labeled "LM4" as shown in FIG. 13A. Once a suitable positioned has been determined, the flip stop 64 may be secured to the first and second rails 62F, 62G by tightening the connecting mechanism 66 against the first and second rails 62F, 62G. Once secured, the woodworker may then introduce a workpiece "WP" where a first outermost end "OE1" directly abuts with the first rail 62F and a second outermost end "OE2" directly abuts the stop arm 64C of the flip stop 64; the second outermost end "OE2" is orthogonal to the first outermost end "OE1" (see FIG. 13B).

Prior to or subsequent to the engagement of the fence assembly 60 with the work table 14, at least one pivot clamp 87 of the clamping system 88 is operably engaged with the work table 14 for clamping and securing the workpiece "WP" with the machining jig 1. The at least one pivot clamp 87 may be operably engaged with the work table 14 via one of the first outer channel 14G1 and the second outer channel 14G2. As illustrated in FIG. 13B, the at least one pivot clamp 87 operably engages with the work table 14 inside of the second outer channel 14G2 via the locking knob assembly 90. Specifically, the head of the bolt 90B operably engages with the upper wall 14G' of the second outer channel 14G2 for securing the at least one pivot clamp 87 with the work table 14. Once engaged, the at least one pivot clamp 87 may be longitudinally moveable along the second outer channel 14G2 when the adjustment knob 90C is loosened from the at least one pivot clamp 87 to enable the woodworker to position the at least one pivot clamp 87 along a surface of the workpiece "WP". Additionally, the at least one pivot clamp 87 may swivel and/or rotate about the bolt 90B when the adjustment knob 90C is loosened from the at least one pivot clamp 87 to enable the woodworker to position the at least one pivot clamp 87 along a surface of a workpiece.

As illustrated in FIG. 13B, the at least one pivot clamp 87 operably engages with a top surface "TS" of the workpiece "WP" to enable a downwardly force on the workpiece "WP" in combination with fence 62 and the flip stop 64 for maintaining the position of the workpiece "WP" on the work table 14. The downward force is applied by the at least one pivot clamp 87 when the woodworker tightens the adjustment knob 90C against the at least one pivot clamp 87. As illustrated herein, the first end 88A of the at least one pivot clamp 87 operably engages with the top surface "TS", and the second end 88B of the at least one pivot clamp 87 operably engages with the outer surface 14E of the work table 14. Once secured, the woodworker may introduce a drill bit of a drill press or similar drilling tool to drill and/or bore a hole at a compound angle enabled by the machining jig 1.

As illustrated in FIG. 13B, a single pivot clamp 87 of the clamping system 88 operably engages the top surface "TS" of the workpiece "WP" to secure the workpiece "WP" to the machining jig 1. In other exemplary embodiments any suitable number of pivot clamps of a clamping system may be operably engaged with a surface of a workpiece for securing said workpiece to a machining jig. In another exemplary embodiment, a woodworker may omit the use of a fence assembly and use more than one pivot clamp of a clamping system for securing said workpiece to a machining jig.

Figure 14:
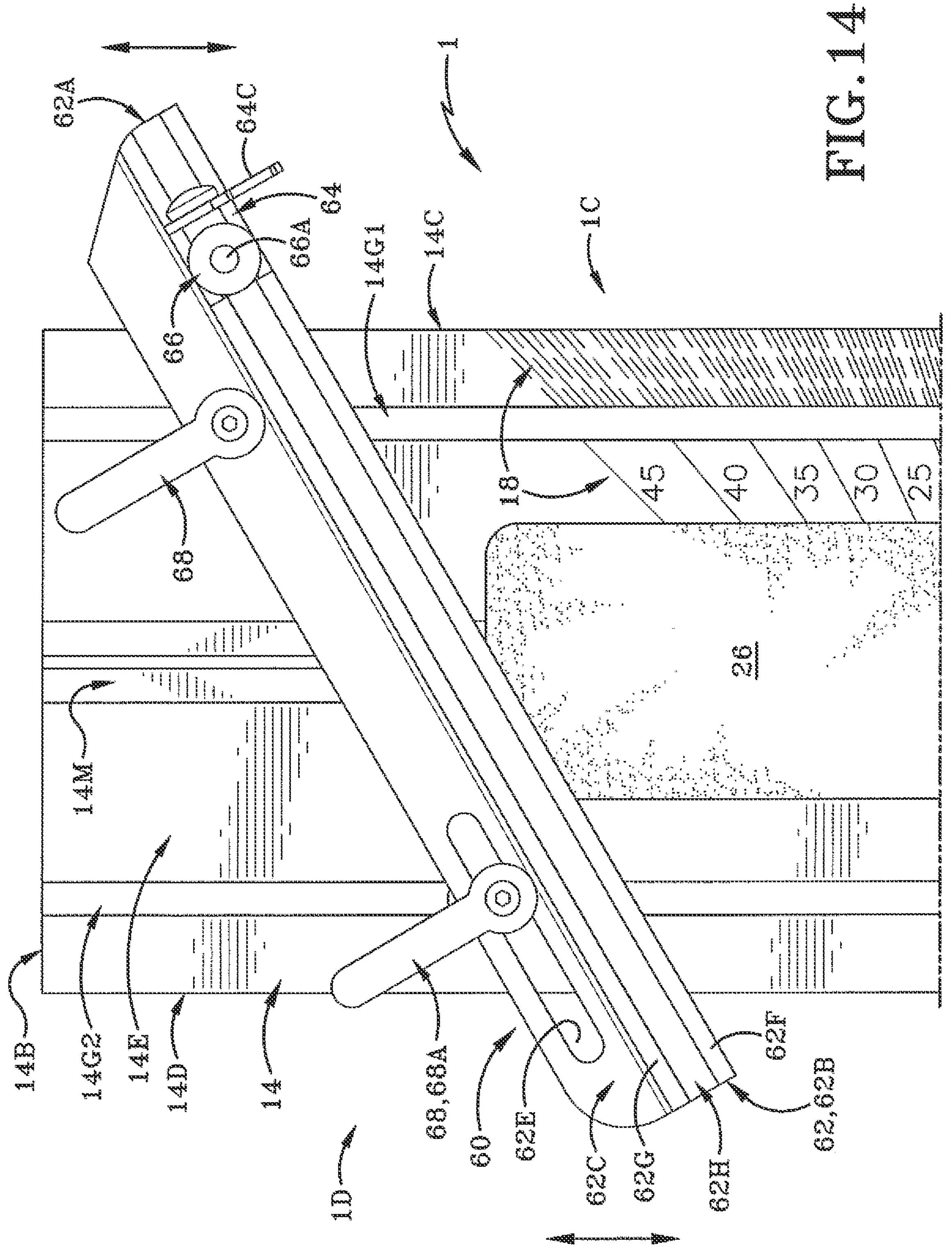
FIG. 14 (FIG. 14) is an operational view of the machining jig operably engaged with the fence assembly, wherein the fence of the fence assembly is provided at a desired angle relative to the work table of the machining jig and provided at a second orientation relative to the work table.

As illustrated herein, the fence 62 of the fence assembly 60 may be oriented in any suitable orientation on the work table 14 based on various considerations, including the size, shape, and configuration of the workpiece, the angle of drilling or boring a hole into a workpiece, and other various considerations of the like that arise during woodworking projects. In FIGS. 12A-12B, the fence 62 of the fence assembly 60 is oriented at a first orientation with the work table 14 where the fence 62 is parallel with the first and second outer channels 14G1, 14G2 of the work table 14. In FIGS. 13A-13B, the fence 62 of the fence assembly 60 is oriented at a second orientation with the work table 14 where the fence 62 is provided at angle relative to the work table 14, and the first rail 62F faces towards the second end 14B of the work table 14. In FIG. 14, the fence 62 of the fence assembly 60 is orientated at a third orientation with the work table 14 where the fence 62 is provided at angle relative to the work table 14 and, the first rail 62F faces towards the first end 14A of the work table 14.

During woodworking projects, the combination of the fence 62 and the adjustable lever mechanisms 68 also enables a woodworker to move one end of the fence 62 from one of the first and second outer channels 14G1, 14G2 of the work table 14 to the other first and second outer channels 14G1, 14G2 the work table 14 while the fence 62 is still operably engaged with the work table 14. For example, the combination of the fence 62 and the adjustable lever mechanisms 68 enables a woodworker to move the first end 62A of the fence 62 from the first outer channel 14G1 and into the second outer channel 14G2 while the second end 62B of the fence 62 is still operably engaged with the work table 14 (e.g., moving the fence from the first orientation (seen in FIG. 12A) to the second orientation or a third orientation (seen in FIGS. 13A-13B and 14).

Figure 15A:
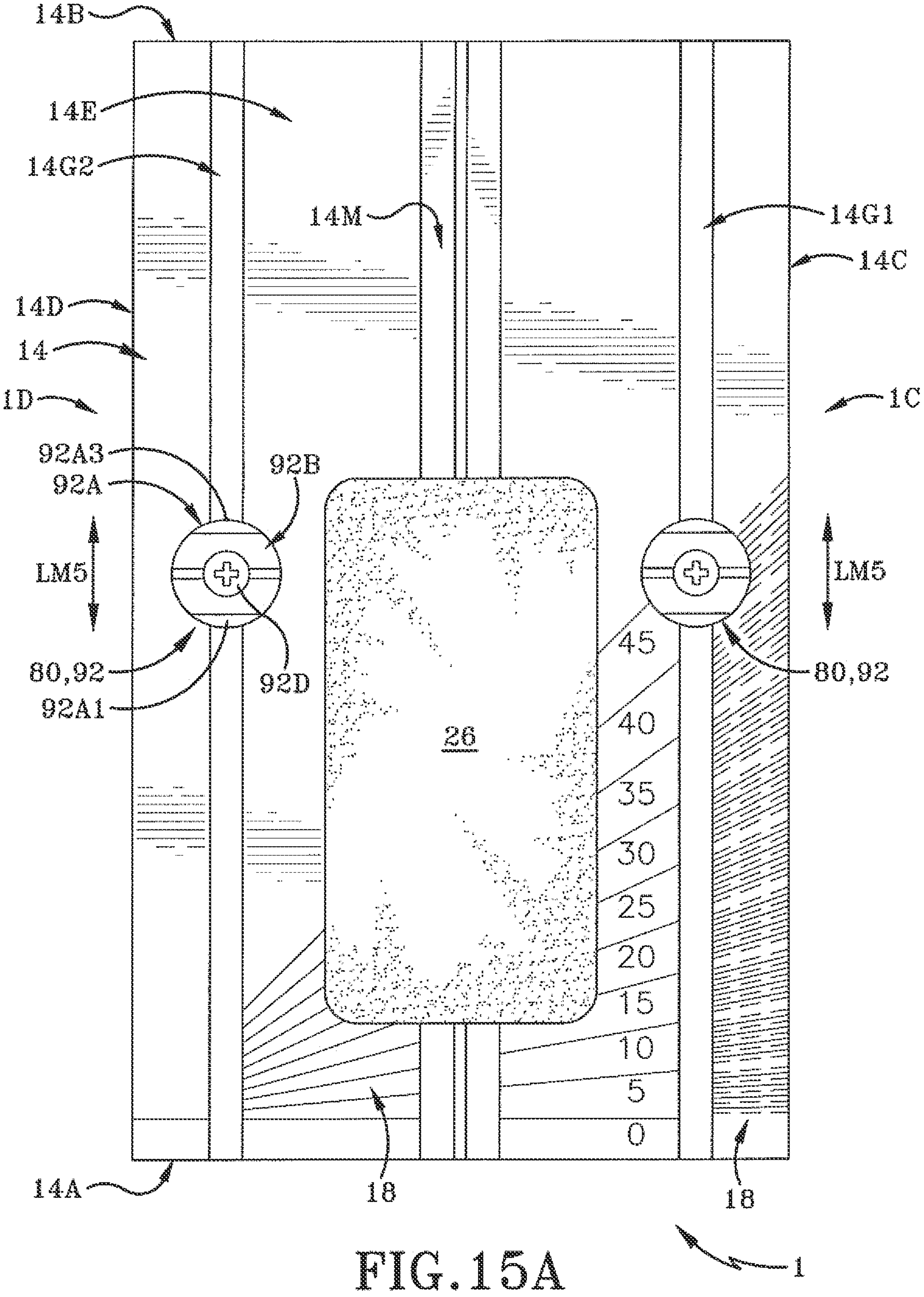
FIG. 15A (FIG. 15A) is an operational view of the machining jig operably engaged with push buttons of the clamping system.
Figure 15B:
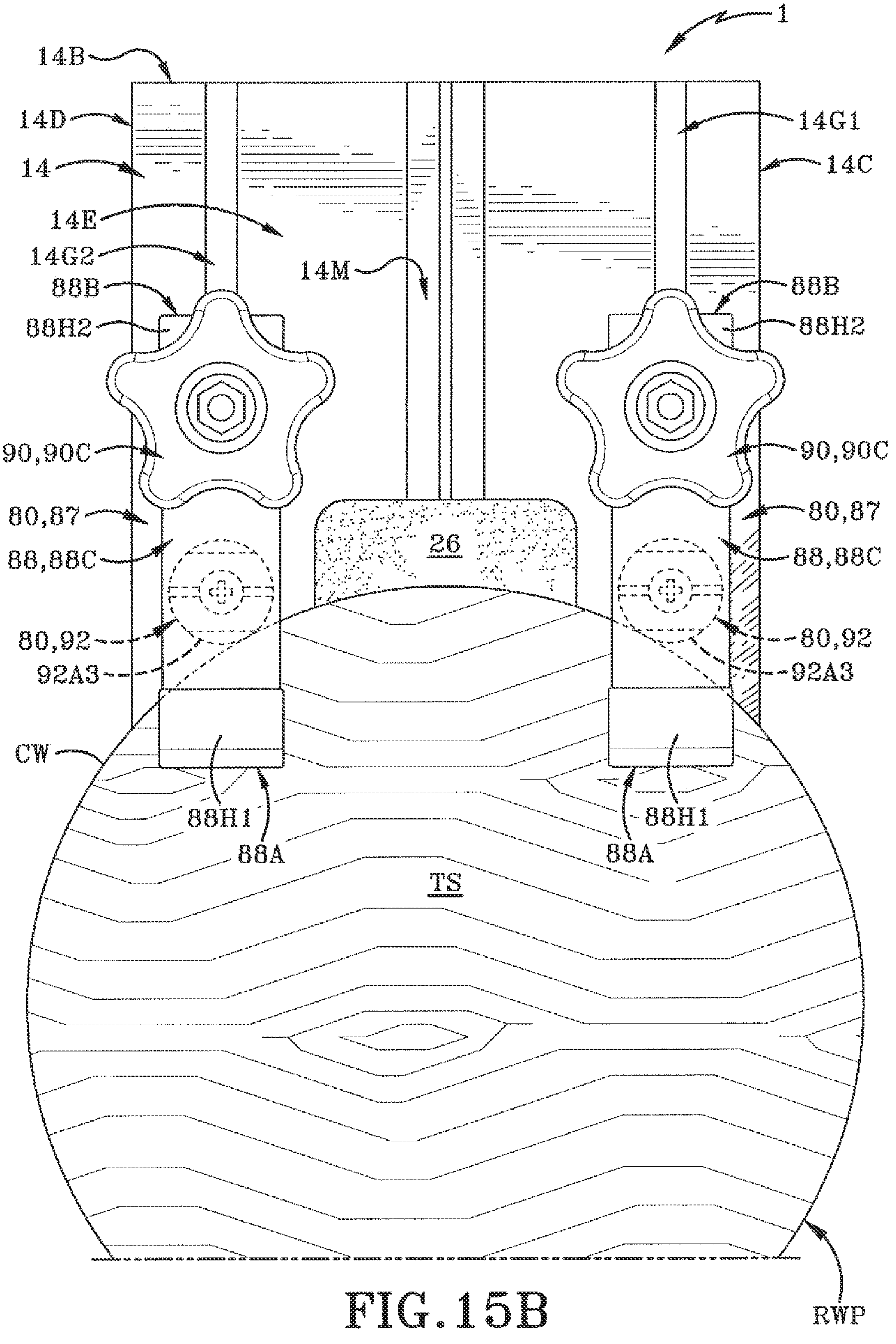
FIG. 15B (FIG. 15B) is an operational view similar to FIG. 15A, but pivot clamps of the clamping system operably engage with the work table, and wherein the push buttons and the pivot clamps collectively secure a round workpiece with the work table.
Figure 16A:
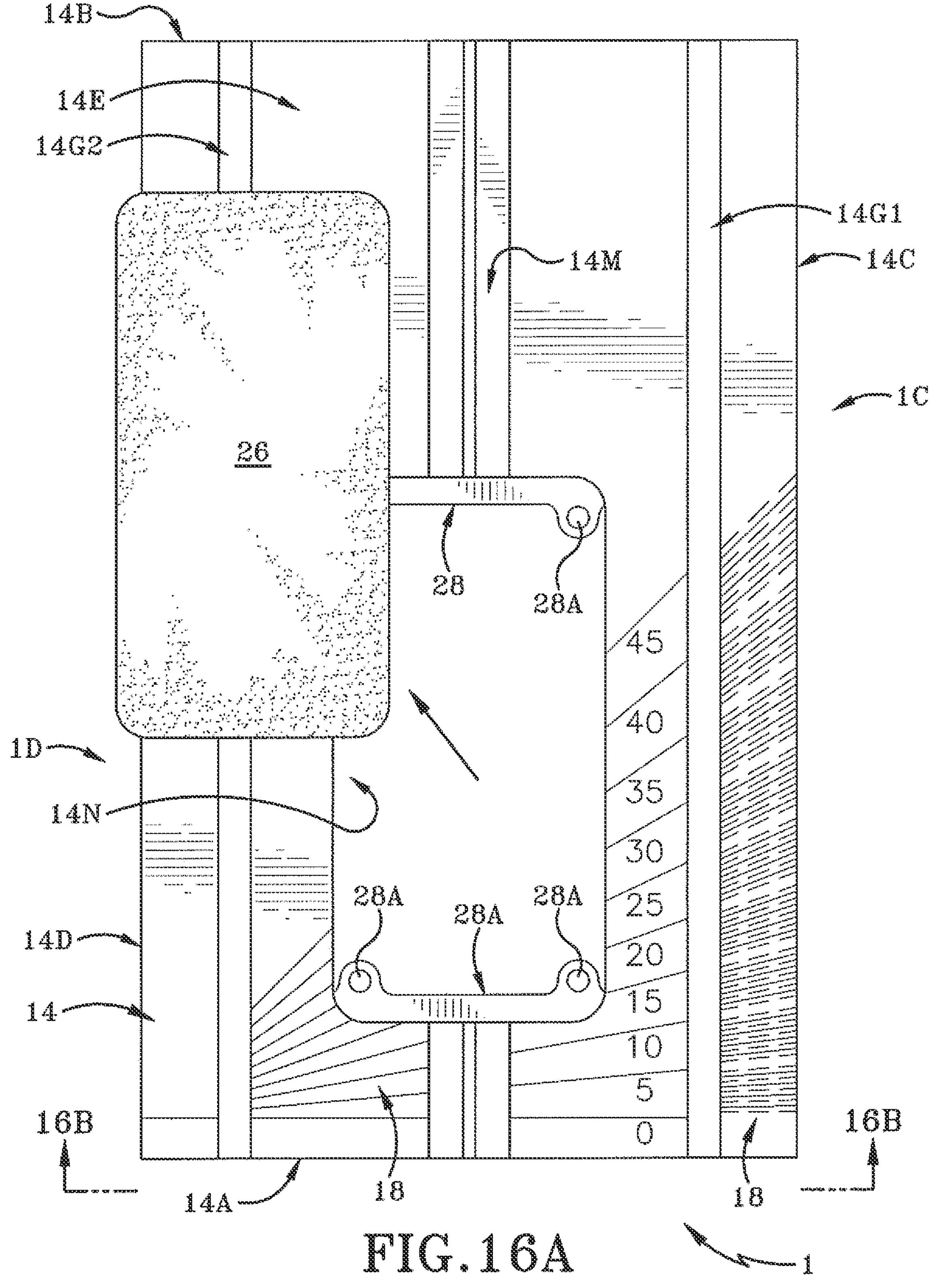
FIG. 16A (FIG. 16A) is an operational view of the machining jig, wherein a sacrificial insert of the machining jig is disengaged and removed from the work table.
Figure 16B:
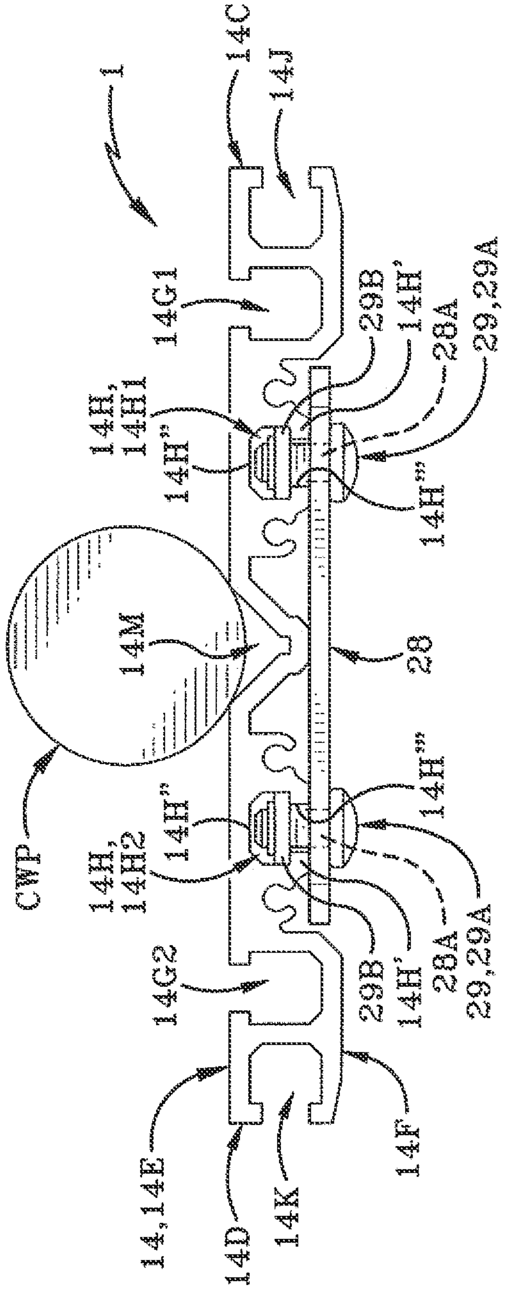
FIG. 16B (FIG. 16B) is an operational sectional view taken in the direction of line 16B-16B in FIG. 16A, wherein a cylindrical workpiece is operably engaged with the work table inside of a V-shaped groove defined by the work table.
Figure 16C:
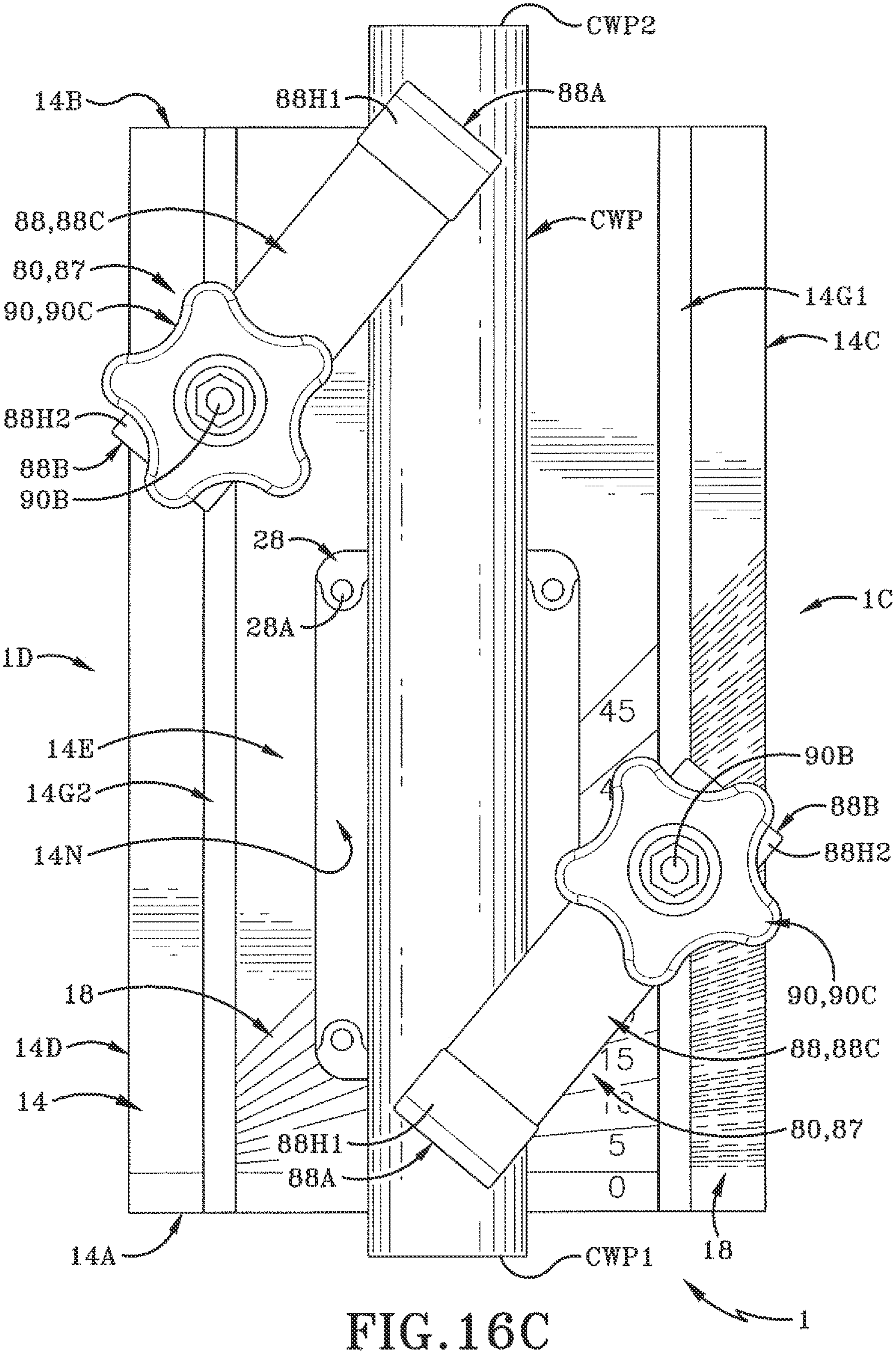
FIG. 16C (FIG. 16C) in an operational view similar to FIG. 16B, but pivot clamps of the clamping system are operably engaged with the work table and hold the cylindrical workpiece inside of the V-shaped groove.

FIGS. 15A-15B illustrate the use of at least one button stop 92 and at least one pivot clamp 87 of the clamping system for securing a round or curvilinear-shaped workpiece "RWP" with the machining jig 1. As illustrated herein, first and second button stops 92 and first and second pivot clamps 88 are used to secure the round workpiece "RWP" with the machining jig 1. In other exemplary embodiments, any suitable number of button stops and pivot clamps may be used for securing a round or curvilinear-shaped workpiece with a machining jig.

As illustrated in FIG. 15A, the woodworker operably engages the first and second button stops 92 with the first and second outer channels 14G1, 14G2 of the work table 14. Specifically, the bench dog 92A of the first button stop 92 operably engages with the first outer channel 14G1 of the work table 14 where the connector 92D threadably engages with the nut 92E inside of the first outer channel 14G1 to secure the bench dog 92A with the work table 14. Similarly, the bench dog 92A of the second button stop 92 operably engages with the second outer channel 14G2 of the work table 14 where the connector 92D threadably engages with the nut 92E inside of the second outer channel 14G2 to secure the bench dog 92A with the work table 14. Once engaged, the bench dogs 92A of the first and second button stops 92 are longitudinally moveable along the first and second outer channels 14G1, 14G2 when the connectors 92D are loosened from the bench dogs 92A to enable movement. Such longitudinal movement of the button stops 92 are denoted by double arrows labeled "LM5" shown in FIG. 15A. The bench dogs 92A of the first and second button stops 92 may then be secured to the work table 14 at desired locations determined by the woodworker when the connectors 92D are tightened to the bench dogs 92A to prevent any longitudinal movement.

Prior to or subsequent to the button stops 92 being operably engaged with the work table 14, the woodworker operably engages the first and second pivot clamps 88 with the work table 14 via the first and second outer channels 14G1, 14G2. Specifically, the first pivot clamp 87 operably engages with the first outer channel 14G1 of the work table 14 where the bolt 90B threadably engages with the nut 90A exterior to the first outer channel 14G1 to secure the first pivot clamp 87 with the work table 14. Similarly, the second pivot clamp 87 operably engages with the second outer channel 14G2 of the work table 14 where the bolt 90B threadably engages with the nut 90A exterior to the second outer channel 14G2 to secure the second pivot clamp 87 with the work table 14. Once engaged, the first and second pivot clamps 88 are longitudinally moveable along the first and second outer channels 14G1, 14G2 when the adjustment knobs 90C are loosened from the pivot clamps 88 to enable movement. The first and second pivot clamps 88 may then be secured to the work table 14 at desired locations determined by the woodworker when the adjustment knobs 90C are tightened to the pivot clamps 88 to prevent any longitudinal movement.

Prior to securing the pivot clamps 88 with the work table 14, the woodworker introduces the round workpiece "RWP" to the pivot clamps 88 and the button stops 92. As illustrated in FIG. 15B, the first ends 88A of the pivot clamps 88 initially engage with a top surface "TS" of the round workpiece "RWP" as the woodworker moves the round workpiece "RWP" along the work table 14 of the machining jig 1. The woodworker ceases movement of the round workpiece "RWP" once a circumferential wall "CW" of the round workpiece "RWP" operably engages with the bench dogs 92A of the first and second button stops 92. The woodworker then tightens the adjustment knobs 90C against the pivot clamps 88 by screwing the adjustment knobs 90C along the bolts 90B. Once secured by the first and second pivot clamps 88 and the first and second button stops 92, the round workpiece "RWP" is maintained on the machining jig 1 and the woodworker may begin drilling holes into the round workpiece "RWP".

Referring to FIG. 14C, first and second pivot clamps 88 of the clamping system 88 may be used to hold and secure cylindrical workpiece "CWP" (e.g., a dowel or rod) on the work table 14 inside of the V-shaped groove 14M. Such engagement of the first and second pivot clamps 88 with the work table 14 via locking knob assemblies 90 in this illustration is identical to the engagement of the pivot clamps 88 with the work table 14 as described above. Once engaged, the first pivot clamp 87 may operably engage a first end "CWP1" of the cylindrical workpiece "CWP" to hold the cylindrical workpiece "CWP" on the work table 14 inside of the V-shaped groove 14M. Similarly, the second pivot clamp 87 may operably engage a second end "CWP2" of the cylindrical workpiece "CWP" opposite to the first end "CWP1" to hold the cylindrical workpiece "CWP" on the work table 14 inside of the V-shaped groove 14M. In this configuration, the sacrificial insert 26 is removed from the work table 14 to allow the cylindrical workpiece "CWP" to rest inside of the V-shaped groove 14M; such removal of the sacrificial insert 26 is described above and illustrated in FIG. 14A.

Figure 17A:
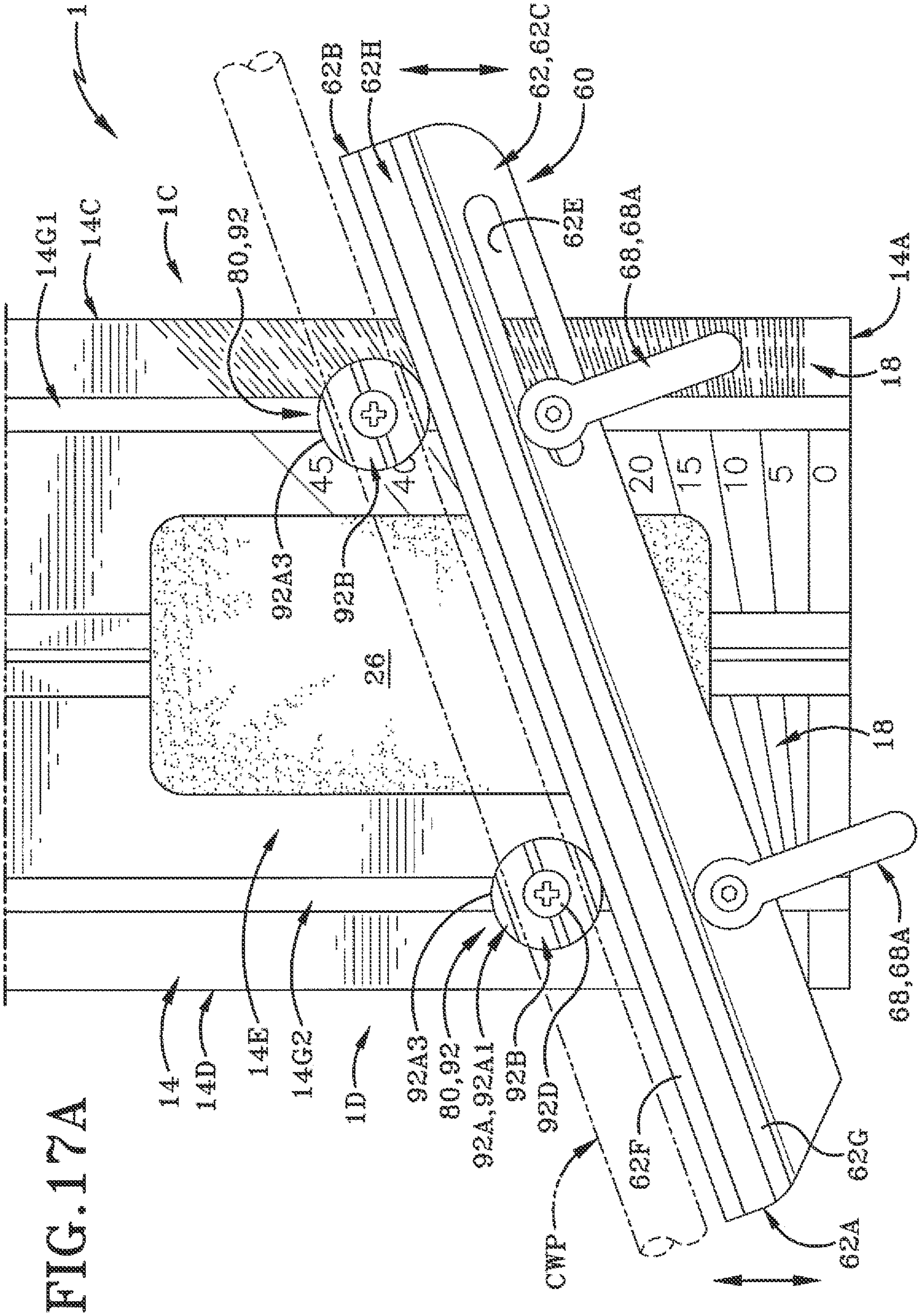
FIG. 17A (FIG. 17A) is an operational view of the machining jig, wherein the fence of the fence assembly and push buttons of the clamping system operably engage with the work table, and wherein a cylindrical workpiece is held by the push buttons and the fence.
Figure 17B:
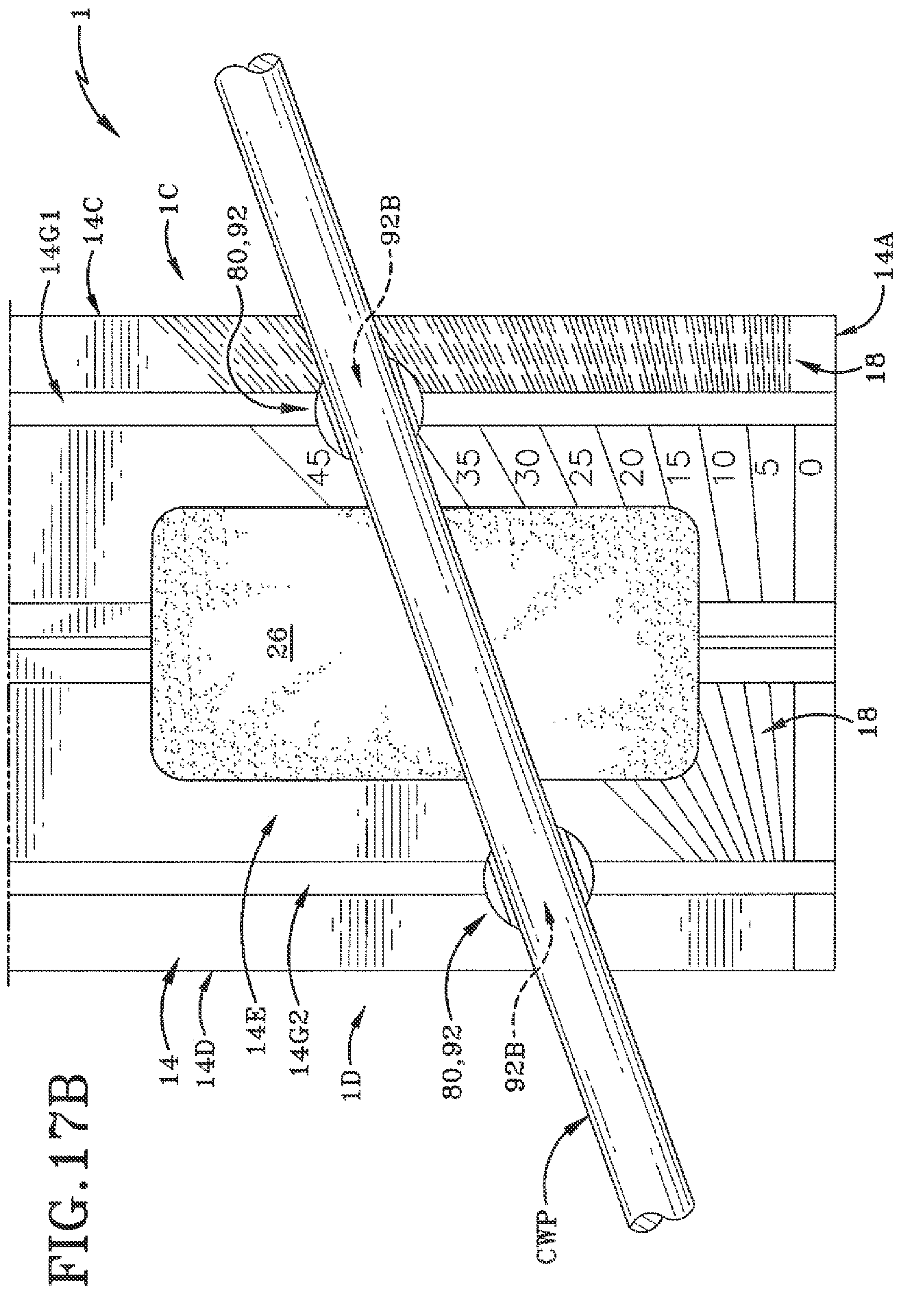
FIG. 17B (FIG. 17B) is an operational view similar to FIG. 17A, but the push buttons of the clamping system operably engage with the work table, and wherein a cylindrical workpiece is held by the push buttons.

Referring to FIGS. 17A and 17B, first and second button stops 92 of the clamping system may be used to hold and secure the cylindrical workpiece "CWP" (e.g., a dowel or rod) with the work table 14 inside of the V-shaped grooves 92B. Such engagement of the first and second button stops 92 with the work table 14 in this illustration is identical to the engagement of the button stops 92 with the work table 14 as described above. Once engaged, the first button stops 92 may operably engage a first end "CWP1" of the cylindrical workpiece "CWP" to hold the cylindrical workpiece "CWP" with the work table 14 inside of the V-shaped groove 92B. Similarly, the second button stops 92 may operably engage a with second end "CWP2" of the cylindrical workpiece "CWP" opposite to the first end "CWP1" to hold the cylindrical workpiece "CWP" with the work table 14 inside of the V-shaped groove 92B. In this configuration, the sacrificial insert 26 may be operably engaged with the work table 14 when using the button stops 92 in this manner.

Still referring to FIG. 17A, the fence 62 of the fence assembly 60 may be operably engaged with the work table 14 in combination with the button stops 92. The fence 62 may enable a woodworker to accurately angle a round workpiece "RWP" with the button stops 92 for accurately drilling a hole in said round workpiece "RWP".

Figure 18:
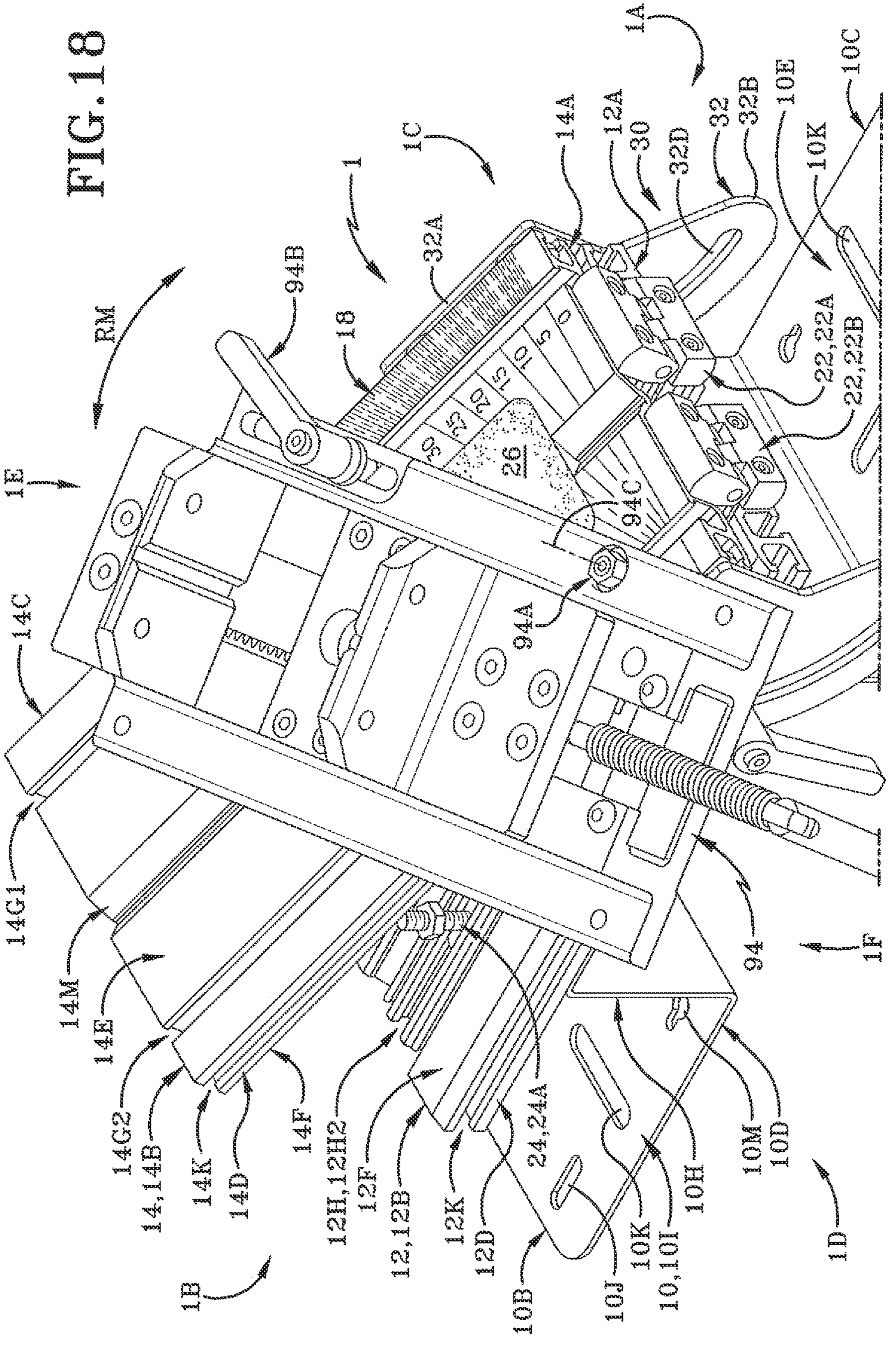
FIG. 18 (FIG. 18) is an operational view of the machining jig, wherein a centering jig is operably engaged with the machining jig.

The machining jig 1 is also capable of operably engaging with other woodworking device or tools for drilling and/or boring holes into various types of workpiece. As illustrated in FIG. 18, the machining jig 1 is capable of operably engaging with centering device or centering vise 94 for centering and securing a workpiece while set at a desired angle defined by the machining jig 1. In other exemplary embodiments, other similar woodworking devices and tools may be operably engaged with the work table 14 via any one of the channels 14G, 14H, 14J, 14K on the work table 14.

As illustrated in FIG. 18, a connecting mechanism 94A operably engages the centering device 94 with the work table 14 via one of the first and second outer channels 14G1, 14G2; the connecting mechanism 94A is substantially similar to other connecting mechanisms described and illustrated herein. As provided herein, the connecting mechanism 94A operably engages the centering device 94 with the work table 14 via the second outer channel 14G2 of the work table 14. An adjustable lever mechanism 94B also operably engages the centering device 94 with the work table 14 via one of the first and second outer channels 14G1, 14G2; the adjustable lever mechanism 94B is substantially similar to other adjustable lever mechanisms described and illustrated herein. As illustrated herein, adjustable lever mechanism 94B operably engages the centering device 94 with the work table 14 via the first outer channel 14G1 of the work table 14.

During operation, the centering device 94 may be pivotable on the work table 14 by rotating the centering device 94 about an axis of rotation 94C defined by a bolt of the connecting mechanism 94A. When the adjustable lever mechanism 94B is loosened from the centering device, the centering device is enabled to pivot and/or rotate on the work table 14 by rotating about the axis of rotation 94C. The rotation movement of the centering device 94 on the work table 14 is denoted by double arrows labeled "RM" in FIG. 18. As such, the woodworker may pivotable adjust and/or move the centering device 94 for a woodworking project by utilizing the angle scale 18 provided on the work table 14. As illustrated herein, the centering device 94 is provided at thirty degrees relative to the work table 14 via the angle scale 18. When the adjustable lever mechanism 94B is tightened to the centering device 94, the centering device 94 is maintained at the desired angle and/or position on the work table 14.

As provided herein, any components and/or devices described and illustrated herein may be used separately and/or in conjunction depending on the woodworking project. In one example, any component or device of the fence assembly 60 described and illustrated herein may be used separately and/or in a conjunction with any component or device of the clamping system 80 described and illustrated herein with any woodworking project. In another example, any component or device of the clamping system 80 described and illustrated herein may be used separately and/or in a conjunction with any component or device of the fence assembly 60 described and illustrated herein with any woodworking project.

Figure 19:
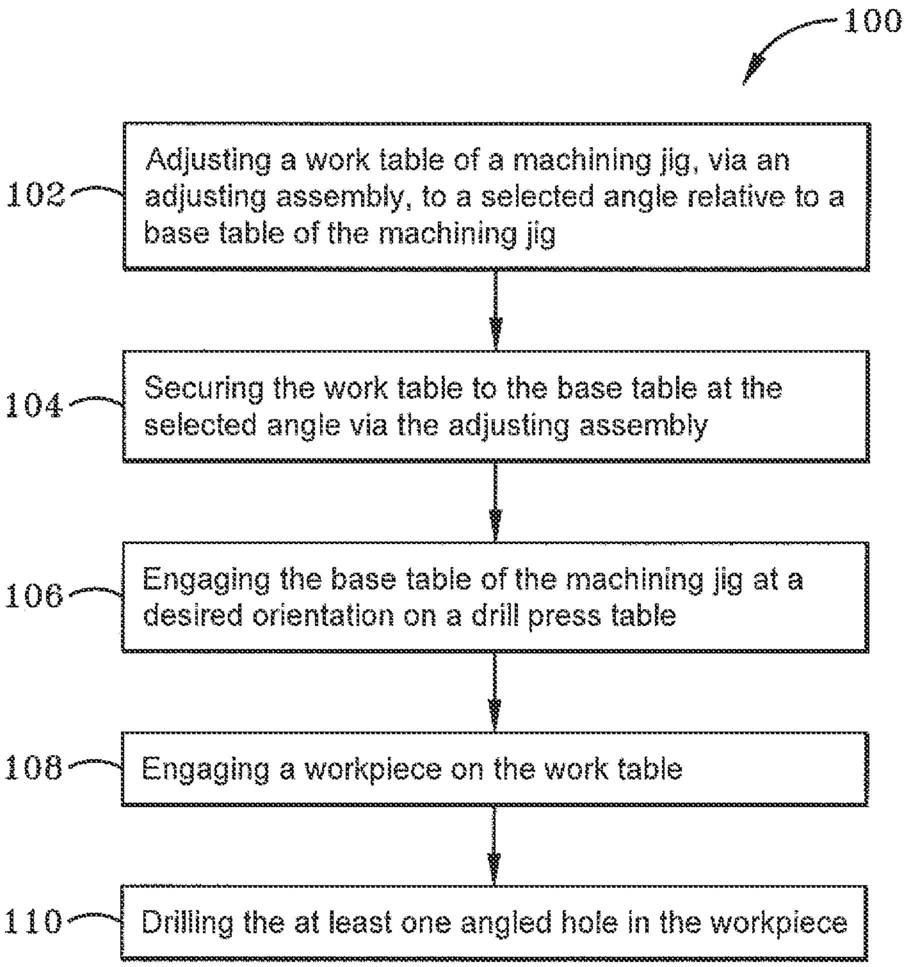

FIG. 19 illustrates a method 100 of drilling at least one angled hole in a workpiece. An initial step 102 of the method 100 comprises adjusting a work table of a machining jig, via an adjusting assembly, to a desired angle relative to a base table of the machining jig. Another step 104 comprises maintaining the work table at the desired angle via the adjusting assembly. Another step 106 comprises engaging the base table and the work table to a riser of the machining jig. Another step 108 comprises engaging the riser to a drill press. Another step 108 comprises drilling the at least one angle hole in the workpiece.

In an exemplary embodiment, method 100 may include additional steps of drilling at least one angled hole in a workpiece. The step of engaging the base table on the drill press table includes optional steps of engaging the base table with a riser of the machining jig; and engaging the riser with the drill press table. Optional steps may further comprise of selecting the selected angle via an indicator of the adjusting assembly; meshing a set of indexing teeth of a protractor plate of the adjusting assembly with a set of selecting teeth of a selector of the adjusting assembly at the selected angle; engaging a first securement mechanism to lock the protractor plate to one of the work table and the base table; and engaging a second securement mechanism to lock the selector to the other of the work table and base table. An optional step may further comprise of engaging a fence of a fence assembly with the work table. Optional steps may further comprise of engaging a fixed wedge of a clamping system with the work table; placing a first outermost end of the workpiece against the fence of the fence assembly; jamming a moveable wedge of the clamping system between the fixed wedge and a second outermost end of the workpiece; and securing the workpiece between the moveable wedge and the fence. Optional steps may further comprise of engaging at least one pivot clamp of a clamp assembly with the work table; and clamping the workpiece to the work table via the at least one pivot clamp. Optional steps may further comprise of engaging a first button stop of a clamp assembly with the work table; engaging a second button stop of the clamp assembly with the work table a distance away from the first button stop; abutting a circumferential wall of the workpiece with the first button stop and the second button stop; and preventing movement of the workpiece on the work table with the first button stop and the second button step. Optional steps may further comprise of engaging a centering device on the work table; introducing the workpiece into the centering device; centering the workpiece in the centering device; and clamping the workpiece to the work table via the centering device.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or e-sources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A machining jig comprising:

a base table having a first front end and an opposing first rear end, and a first longitudinal axis defined therebetween and being adapted to be operably engaged with a drill press table;

a work table operably engaged with the base table and having a second front end, an opposing second rear end, and a second longitudinal axis defined therebetween; wherein the work table is pivotably moveable relative to the base table about a pivot axis defined by at least one hinge attached at the first front end and the second front end and being remote from a drill location of the drill press table; and an adjustment assembly operably engaged with the work table and the base table and being longitudinally spaced apart from the pivot axis relative to the first and second longitudinal axes, the adjustment assembly comprises:

a protractor plate operably engaged with one of the work table and the base table and defining a set of indexing teeth, wherein the set of indexing teeth defines the range of predetermined angles; and a selector operably engaged with the other of the work table and the base table and defining a set of selecting teeth, wherein the set of selecting teeth is configured to operably mesh with the set of indexing teeth of the protractor plate to secure the work table at the selected angle relative to the base table;

wherein the adjustment assembly is configured to pivotably adjust the work table to an angle relative to the base table, and wherein the angle is selected from a range of predetermined angles.

2. The machining jig of claim 1, further comprising:

a riser operably engaged with the base table;

wherein the riser is operably engaged with the drill press table and is interposed between the base table and the drill press table; and wherein the riser elevates the base table a distance away from the drill press table.

3. The machining jig of claim 2, wherein the riser comprises:

a platform configured to operably engage with the base table;

at least one foot operably engaged with the platform; and wherein the at least one foot is adapted to be operably engaged with the drill press table.

4. The machining jig of claim 3, wherein the riser further comprises:

at least one attachment aperture defined in the at least one foot; and at least one fastener receivable through the at least one attachment aperture to operably engage the at least one foot with the drill press table.

5. The machining jig of claim 3, wherein the riser further comprises:

at least one key hole defined in the at least one foot, wherein the at least one key hole is adapted to receive a fastener to engage the machining jig on a remote support surface.

6. The machining jig of claim 1, wherein the adjustment assembly includes a meshing mechanism which secures the work table to the base table at the selected angle.

7. The machining jig according to claim 1, further comprising:

an indicator operably configured to indicate the selected angle on the protractor plate at which the work table is positioned relative to the base table.

8. The machining jig of claim 1, further comprising:

a locking plate assembly operably engaged with the base table and the work table and is located opposite the adjustment assembly on the base table and the work table; and wherein the locking plate assembly maintains the work table at the selected angle relative to the base table.

9. The machining jig of claim 1, further comprising:

a fence assembly operably engaged with the work table, wherein the fence assembly is selectively adjustable relative to the work table and is positionable at a second angle that is different to the selected angle at which the work table is secured to the base table.

10. The machining jig of claim 9, wherein the fence assembly comprises:

a fence having a plate and a first rail and a second rail extending away from the plate and collectively defining a T-shaped channel; wherein the fence is adapted to operably engage with a first outermost edge of a workpiece; and at least one adjustment lever operably engaging the fence with the work table via at least one outer channel defined in the work table.

11. The machining jig of claim 10, wherein the fence assembly further comprises:

a flip stop operably engaged with the first rail and the second rail of the fence; wherein the flip stop is adapted to operably engage with a second outermost edge of the workpiece that is orthogonal to the first outermost edge of the workpiece.

12. The machining jig of claim 1, further comprising:

an angle scale provided on the work table, wherein the angle scale is configured to provide at least one set of measurement markings.

13. The machining jig of claim 1, wherein the work table includes an outer surface, and a V-shaped groove is defined in the outer surface, and wherein the V-shaped groove is adapted to allow the work table to hold a curvilinear workpiece.

14. The machining jig of claim 1, wherein the work table includes:

a central opening defined by the work table;

wherein the machining jig includes a sacrificial insert operably engaged with the work table; and wherein the sacrificial insert is positioned inside of the central opening of the work table.

15. The machining jig of claim 1, further comprising:

a clamping system operably engaged with the work table, wherein the clamping system is adapted to secure a workpiece to the work table.

16. The machining jig of claim 15, wherein the clamping system comprises:

a fixed wedge operably engaged with the work table; and a moveable wedge operably engaged with the fixed wedge and the workpiece.

17. The machining jig of claim 15, wherein the clamping system further comprises:

at least one pivot clamp pivotally engaged with the work table and adapted to selectively clamp the workpiece.

18. The machining jig of claim 15, wherein the clamping system further comprises:

at least one button stop operably engaged with the work table, wherein the at least button stop is adapted to secure an outermost end of a round workpiece on the work table.

19. The machining jig of claim 1, further comprising a centering device operably engageable with the work table and adapted to receive a workpiece therein.

20. A method of drilling at least one angled hole in a workpiece, comprising steps of:

providing a base table of a machining jig that includes a first front end, an opposing first rear end, and a first longitudinal axis defined therebetween;

providing a work table of the machining jig that includes a second front end, an opposing second rear end, and a second longitudinal axis defined therebetween;

pivoting the work table relative to the base table about a pivot axis defined by at least one hinge attached at the first front end and the second front end; wherein the pivot axis is remote from a drill location of a drill press table;

adjusting the work table of the machining jig, via an adjusting assembly, to a selected angle relative to the base table of the machining jig; wherein the adjusting assembly is longitudinally spaced apart from the pivot axis relative to the first and second longitudinal axes; the adjusting assembly comprising:

a protractor plate operably engaged with one of the work table and the base table; and a selector operably engaged with the other of the work table and the base table;

meshing a set of indexing teeth of the protractor plate of the adjusting assembly with a set of selecting teeth of the selector of the adjusting assembly at the selected angle;

securing the work table to the base table at the selected angle via the selector of the adjusting assembly;

engaging the base table of the machining jig at a desired orientation on the drill press table;

engaging a workpiece on the work table; and drilling the at least one angled hole in the workpiece.

21. The method of claim 20, wherein the step of engaging the base table on the drill press table includes:

engaging the base table with a riser of the machining jig; and engaging the riser with the drill press table.

22. The method of claim 20, further comprising:
selecting the selected angle via an indicator of the adjusting assembly;
engaging a first securement mechanism to lock the protractor plate to one of the work table and the base table; and
engaging a second securement mechanism to lock the selector to the other of the work table and base table.

23. The method of claim 20, further comprising:
engaging a fence of a fence assembly with the work table.

24. The method of claim 23, further comprising:
engaging a fixed wedge of a clamping system with the work table;
placing a first outermost end of the workpiece against the fence of the fence assembly;
jamming a moveable wedge of the clamping system between the fixed wedge and a second outermost end of the workpiece; and
securing the workpiece between the moveable wedge and the fence.

25. The method of claim 20, further comprising:
engaging at least one pivot clamp of a clamp assembly with the work table; and
clamping the workpiece to the work table via the at least one pivot clamp.

26. The method of claim 20, further comprising:
engaging a first button stop of a clamp assembly with the work table;
engaging a second button stop of the clamp assembly with the work table a distance away from the first button stop;
abutting a circumferential wall of the workpiece with the first button stop and the second button stop; and
preventing movement of the workpiece on the work table with the first button stop and the second button step.

27. The method of claim 20, further comprising:
engaging a centering device on the work table;
introducing the workpiece into the centering device;
centering the workpiece in the centering device; and
clamping the workpiece to the work table via the centering device.

* * * * *